(12) United States Patent
Berbee et al.

(10) Patent No.: US 10,494,457 B2
(45) Date of Patent: Dec. 3, 2019

(54) HIGH PRESSURE, FREE RADICAL POLYMERIZATIONS TO PRODUCE ETHYLENE-BASED POLYMERS

(71) Applicants: Dow Global Technologies LLC, Midland, MI (US); Dow Brasil Sudeste Industrial Ltda., Sao Paulo/Sp (BR)

(72) Inventors: Otto J. Berbee, Hulst (NL); Cornelis J F Hosman, Ijzendijke (NL); Joaquin Flores, Aguilar de Campoo (ES); Sergio E. Goncalves, Guaruja (BR); Sarat Munjal, Lake Jackson, TX (US); Michael E. Bishop, Rosharon, TX (US); Luiz Rodriguez, Guarujá (BR)

(73) Assignee: Dow Global Technologies LLC, Midland, MI (US)

( * ) Notice: Subject to any disclaimer, the term of this patent is extended or adjusted under 35 U.S.C. 154(b) by 21 days.

(21) Appl. No.: 15/769,296

(22) PCT Filed: Nov. 10, 2016

(86) PCT No.: PCT/US2016/061390
§ 371 (c)(1),
(2) Date: Apr. 18, 2018

(87) PCT Pub. No.: WO2017/083559
PCT Pub. Date: May 18, 2017

(65) Prior Publication Data
US 2018/0305476 A1    Oct. 25, 2018

(30) Foreign Application Priority Data
Nov. 10, 2015    (EP) .................................... 15382554

(51) Int. Cl.
*C08F 10/02*    (2006.01)
*C08F 2/01*    (2006.01)
(Continued)

(52) U.S. Cl.
CPC ........... *C08F 10/02* (2013.01); *B01J 19/0013* (2013.01); *B01J 19/1812* (2013.01); *C08F 2/01* (2013.01);
(Continued)

(58) Field of Classification Search
CPC .... C08F 10/02; C08F 2/01; C08F 2/38; C08F 110/02; Y02P 20/582; B01J 19/0013;
(Continued)

(56) References Cited

U.S. PATENT DOCUMENTS

| | | | |
|---|---|---|---|
| 4,135,044 A | 1/1979 | Beals | |
| 5,844,045 A | 12/1998 | Kolthammer et al. | |

(Continued)

FOREIGN PATENT DOCUMENTS

| | | |
|---|---|---|
| EP | 3168237 A1 | 5/2017 |
| EP | 3168238 A1 | 5/2017 |

(Continued)

OTHER PUBLICATIONS

Extended European Search Report pertaining to European Patent Application No. 15382554.2 dated May 3, 2016.
(Continued)

*Primary Examiner* — William K Cheung
(74) *Attorney, Agent, or Firm* — Dinsmore & Shohl LLP

(57) ABSTRACT

A process to form an ethylene-based polymer, said process comprising at least the following: polymerizing a mixture comprising ethylene, in the presence of at least one free-radical initiator, and in a reactor configuration comprising at least three reaction zones and at least two ethylene feed streams; and wherein the inlet pressure of the first reaction zone is less than, or equal to, 3200 Bar; and wherein the amount of ethylene, and optionally one or more comonomers, and optionally one or more CTAs, fed to the first reaction zone is from 40 mole % to 80 mole %, based on the
(Continued)

total moles of ethylene, and optionally one or more comonomers, and optionally one or more CTAs, fed to the polymerization; and wherein the average polymerization temperature of the first 40 wt % polymer formed ($APT_{40\ wt\%}$) (based on the total amount of polymer formed) is less than, or equal to, 200° C.

10 Claims, 4 Drawing Sheets

(51) Int. Cl.
  *C08F 2/38* (2006.01)
  *C08F 110/02* (2006.01)
  *B01J 19/00* (2006.01)
  *B01J 19/18* (2006.01)

(52) U.S. Cl.
  CPC .............. *C08F 2/38* (2013.01); *C08F 110/02* (2013.01); *B01J 2219/00159* (2013.01); *B01J 2219/00162* (2013.01); *B01J 2219/00763* (2013.01); *Y02P 20/582* (2015.11)

(58) Field of Classification Search
  CPC .......... B01J 19/1812; B01J 2219/00159; B01J 2219/00162; B01J 2219/00763
  USPC ...................................................... 526/65
  See application file for complete search history.

(56) References Cited

U.S. PATENT DOCUMENTS

| | | | |
|---|---|---|---|
| 5,869,575 | A | 2/1999 | Kolthammer et al. |
| 6,448,341 | B1 | 9/2002 | Kolthammer et al. |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 7,563,413 | B2 | 7/2009 | Naets et al. |
| 7,582,709 | B2 | 9/2009 | Goossens et al. |
| 7,745,550 | B2 | 6/2010 | Donck et al. |
| 8,273,835 | B2 | 9/2012 | Littmann et al. |
| 8,415,442 | B2 | 4/2013 | Karjala et al. |
| 8,445,606 | B2 | 5/2013 | Lammens et al. |
| 8,822,601 | B2 | 9/2014 | Karjala et al. |
| 8,871,876 | B2 | 10/2014 | Berbee et al. |
| 9,120,880 | B2 | 9/2015 | Zschoch et al. |
| 9,228,036 | B2 | 1/2016 | Berbee et al. |
| 9,234,055 | B2 | 1/2016 | Berbee et al. |
| 9,809,701 | B2 | 11/2017 | den Doelder et al. |
| 9,828,496 | B2 | 11/2017 | den Doelder et al. |
| 2007/0032614 | A1 | 2/2007 | Goossens et al. |
| 2011/0294967 | A1* | 12/2011 | Littmann ............. B01J 4/008 526/64 |
| 2016/0137822 | A1 | 5/2016 | den Doelder et al. |

FOREIGN PATENT DOCUMENTS

| | | | |
|---|---|---|---|
| EP | 3168239 | A1 | 5/2017 |
| GB | 1370101 | A | 10/1974 |
| WO | 0168723 | A2 | 9/2001 |
| WO | 0214379 | A1 | 2/2002 |
| WO | 2006094723 | A1 | 9/2006 |
| WO | 2012044504 | A1 | 4/2012 |
| WO | 2012117039 | A1 | 9/2012 |
| WO | 2013059042 | A1 | 4/2013 |
| WO | 2014190041 | A1 | 11/2014 |
| WO | 2015166297 | A1 | 11/2015 |
| WO | 2016109266 | A1 | 7/2016 |
| WO | 2016210235 | A1 | 12/2016 |
| WO | 2017058570 | A1 | 4/2017 |
| WO | 2017083552 | A1 | 5/2017 |
| WO | 2017083559 | A1 | 5/2017 |
| WO | 2017083563 | A1 | 5/2017 |
| WO | 2017146981 | A1 | 8/2017 |
| WO | 2017201110 | A1 | 11/2017 |

OTHER PUBLICATIONS

International Search Report and Written Opinion pertaining to PCT/US2016/061390 dated Jan. 25, 2017.
International Search Report and Written Opinion pertaining to PCT/US2015/066860 dated Mar. 29, 2016.
Extended European Search Report pertaining to European Patent Application No. 16382298.4 dated Oct. 24, 2016.
International Search Report and Written Opinion pertaining to PCT/US2017/038771 dated Aug. 24, 2017.
Goto et al., "Computer Model for Commercial High-Pressure Polyethylene Reactor Based on Elementary Reaction Rates Obtained Experimentally", J. Applied Polymer Science, 36, 21-40, 1981.
Luft, Gerhard, Chem.-Ing.-Tech., Hochdruck-Polyaethylen, vol. 51 (1979) Nr. 10, pp. 960-969.
Ehrlich et al., "Fundamentals of the free radical polymerization of ethylene", Adv. Polymer Sci., vol. 7, 386-448 (1970).
Mortimer, G., "Chain transfer in ethylene polymerization", Journal of Polymer Science: Part A-1, vol. 4, p. 881-900 (1966).
Mortimer, G., "Chain transfer in ethylene polymerization. IV. Additional study at 1360 atm and 130° C.", Journal of Polymer Science: Part A-1, ; vol. 8, p. 1513-1523 (1970).
Mortimer, G., "Chain transfer in ethylene polymerization. Part V. The effect of temperature", Journal of Polymer Science: Part A-1, ; vol. 8, p. 1535-1542 (1970).
Mortimer, G., "Chain transfer in ethylene polymerization VII. Very reactive and depletable transfer agents", Journal of Polymer Science: Part A-1, vol. 10, p. 163-168 (1972).
Yamamoto et al., "Rate Constant for Long-Chain Branch Formation in Free-Radical Polymerization of Ethylene", J. Macromol. Science-Chem. 1979, 1067.
Maggi et al., "Enhancing the Design of Hyper Compressors and Related LDPE Plants Components", GE Oil & Gas, 2015.
Giacomelli et al., "Preliminary Pulsation Analysis for High Pressure Piping Size Evaluation for Hyper-Compressors for LDPE Plants", Proceedings of PVP 2006, Pressure Vessels and Piping, Jul. 23-27, 2006, Vancouver, BC, Canada.

* cited by examiner

HIGH PRESSURE, FREE RADICAL POLYMERIZATIONS TO PRODUCE ETHYLENE-BASED POLYMERS

REFERENCE TO RELATED APPLICATIONS

This application is a national stage filing under 35 U.S.C. § 371 of international PCT application, PCT/US2016/061390, filed Nov. 10, 2016, which claims priority to European patent application, EP 15382554.2, filed Nov. 10, 2015, each of which is incorporated herein by reference in its entirety.

BACKGROUND OF INVENTION

Low Density Poly Ethylene (LDPE) is produced in an autoclave and/or tubular reactor at high pressure and temperature. High pressure, free-radical polymerizations are disclosed in the following references: U.S. Pat. Nos. 8,445,606, 4,135,044, 7,582,709, and JP050534422 (Abstract). The tubular process is preferred over the autoclave process by its capability to increase conversion by abstracting polymerization heat through cooling from the tubular reaction and cooling sections. However, it would be desirable to combine the higher conversion potential of a tubular process with the product capability of an autoclave process. Another parameter of importance is the polymer output of a high pressure polymerization process, which can range from 40 to 450 KTA or higher. The polymer output of a high pressure tubular process is affected by conversion level and monomer throughput. The conversion is governed by the desired products properties of the polymers to be produced. The monomer throughput depends on the design and the operating conditions of a secondary compressor system, which compresses the monomer feed stream to the required reactor inlet pressure.

Another parameter of importance is the energy required to produce a unit of high pressure polyethylene polymer. This energy requirement is largely determined by the compression energy required by the secondary compressor system. Thus, there is a need to maximize polymer production through increasing conversion level for a given amount of compression energy and/or to use less compression energy for compression the monomer reactor feed stream by reducing the reactor inlet pressure. The requirements on maximizing polymer output, extending product capability and/or reducing energy requirement have been met by the following invention.

SUMMARY OF THE INVENTION

A process to form an ethylene-based polymer, in the presence of at least one free-radical, said process comprises at least the following:
polymerizing a mixture comprising ethylene, in the presence of at least one free-radical initiator, and in a reactor configuration comprising at least three reaction zones and at least two ethylene feed streams; and wherein the inlet pressure of the first reaction zone is less than, or equal to, 3200 Bar; and
wherein the amount of ethylene, and optionally one or more comonomers and optionally one or more CTAs, fed to the first reaction zone is from 40 mole % to 80 mole %, based on the total moles of ethylene, and optionally one or more comonomers and optionally one or more CTAs, fed to the polymerization; and
wherein the average polymerization temperature of the first 40 wt % polymer formed ($APT_{40\ wt\ \%}$) (based on the total amount of polymer formed) is less than, or equal to, 200° C.

A process to form an ethylene-based polymer, in the presence of at least one free-radical, said process comprises at least the following:
polymerizing a mixture comprising ethylene, in the presence of at least one free-radical initiator, and in a reactor configuration comprising at least four reaction zones and at least three ethylene feed streams; and
wherein the inlet pressure of the first reaction zone is less than, or equal to, 3200 Bar; and wherein the amount of ethylene, and optionally one or more comonomers and optionally one or more CTAs, fed to the first reaction zone is from 20 mole % to 70 mole %, based on the total moles of ethylene, and optionally one or more comonomers and optionally one or more CTAs, fed to the polymerization; and
wherein the average polymerization temperature of the first 40 wt % polymer formed ($APT_{40\ wt\ \%}$) (based on the total amount of polymer formed) is less than, or equal to 200° C.

DETAILED DESCRIPTION

Figure 1:
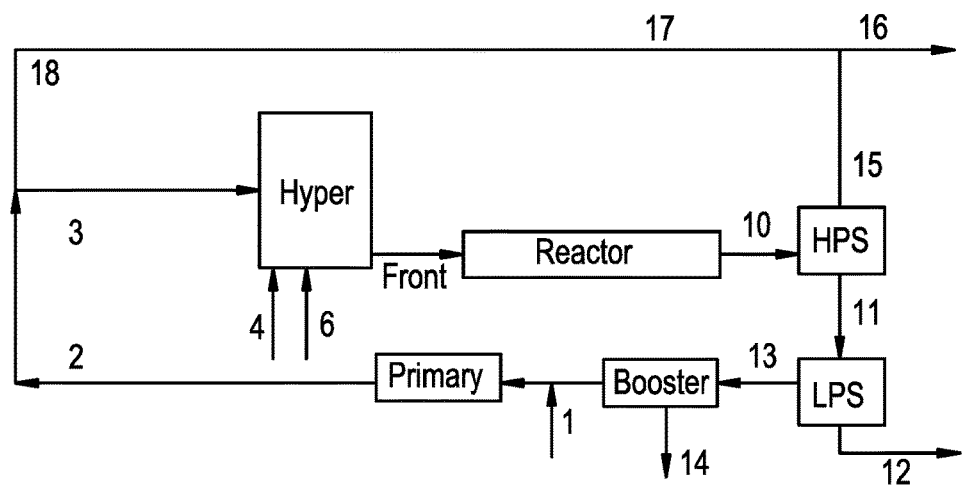
FIG. 1 is a process flow diagram containing a tubular reactor used for comparative polymerizations CP1 to CP3, CP1.1 and CP1.2.

New polymerization processes have been discovered that provide ethylene-based polymers with significant narrow molecular weight distributions, at reduced pressure levels with high polymer output. It has also been discovered that broad and narrow MWD polymers can be produced at constant polymer output, providing better economics for the polymerization processes. It has been discovered that the discharges of the plungers of the second compression stage of a secondary compressor system can be arranged for equal or different distributions of ethylene feed streams over the reaction zones, for increasing the range of the molecular weight distribution of the polymer products. In addition, it has also been discovered that by distributing fresh ethylene to the side of the reactor, and/or distributing fresh CTA to the front of the reactor the narrow MWD product and process capabilities can be further enhanced.

As discussed above, a process is provided to form an ethylene-based polymer, in the presence of at least one free-radical, said process comprises at least the following:

polymerizing a mixture comprising ethylene, in the presence of at least one free-radical initiator, and in a reactor configuration comprising at least three reaction zones and at least two ethylene feed streams; and wherein the inlet pressure of the first reaction zone is less than, or equal to, 3200 Bar; and wherein the amount of ethylene, and optionally one or more comonomers and optionally one or more CTAs, fed to the first reaction zone is from 40 mole % to 80 mole %, based on the total moles of ethylene, and optionally one or more comonomers and optionally one or more CTAs, fed to the polymerization; and wherein the average polymerization temperature of the first 40 wt % polymer formed ($APT_{40\ wt\ \%}$) (based on the total amount of polymer formed) is less than, or equal to, 200° C.

In one embodiment, the reactor configuration comprises at least three ethylene feed streams.

In one embodiment, the reactor configuration comprises only two ethylene feed streams.

The invention provides a process to form an ethylene-based polymer, in the presence of at least one free-radical, said process comprises at least the following:

polymerizing a mixture comprising ethylene, in the presence of at least one free-radical initiator, and in a reactor configuration comprising at least four reaction zones and at least three ethylene feed streams; and wherein the inlet pressure of the first reaction zone is less than, or equal to, 3200 Bar; and wherein the amount of ethylene, and optionally one or more comonomers and optionally one or more CTAs, fed to the first reaction zone is from 20 mole % to 70 mole %, based on the total moles of ethylene, and optionally one or more comonomers and optionally one or more CTAs, fed to the polymerization; and wherein the average polymerization temperature of the first 40 wt % polymer formed ($APT_{40\ wt\ \%}$) (based on the total amount of polymer formed) is less than, or equal to, 200° C.

In one embodiment, the reactor configuration comprises at least four ethylene feed streams.

In one embodiment, the reactor configuration comprises only three ethylene feed streams.

An inventive process may comprise a combination of two or more embodiments described herein.

In one embodiment, the maximum temperature for each reaction zone, except for reaction zone 1 is >271° C., or >272° C., or >274° C., or >276° C., or >278° C., or >280° C. In one embodiment, the maximum temperature for each reaction zone, except for reaction zone 1 and reaction zone 2, is >271° C., or >272° C., or >274° C., or >276° C., or >278° C., or >280° C. In one embodiment, the maximum temperature for each reaction zone, except for reaction zone 1, reaction zone 2 and reaction zone 3, is >271° C., or >272° C., or >274° C., or >276° C., or >278° C., or >280° C. In one embodiment, the maximum temperature for each reaction zone is <340° C., or <330° C., or <320° C.

In one embodiment, the combined amount of monomers and CTA(s) fed to the first reaction zone is from 20 to 40 mole % of the combined amount of monomers and CTA(s) fed to the polymerization. In one embodiment, the amount of ethylene, and optionally one or more comonomers and optionally one or more CTAs, fed to the first reaction zone, is from 45 mole % to 75 mole %, or from 40 to 70 mole %, based on the total moles of ethylene, and optionally one or more comonomers, and optionally one or more CTAs, fed to the polymerization. In one embodiment, the combined amount of monomers and CTA(s) fed to the first reaction zone is from 20 to 60 mole %, or from 20 to 50 mole %, or from 20 to 45 mole %, of the combined amount of monomers and CTA(s) fed to the polymerization.

In one embodiment, average polymerization temperature of the "first 40 wt % polymer (based on the total amount of polymer formed) formed" is less than, or equal to, 200° C., or ≤199° C., or ≤198° C., or ≤197° C., or ≤196° C., or ≤195° C.

In one embodiment, the first "40 wt % of total polymer, is formed at a polymer weighted average polymerization temperature, T1," and the remaining "60 wt % of total polymer, is formed at a polymer weighted average polymerization temperature of T2," and wherein (T2−T1)≥58° C., or ≥59° C., or ≥60° C., or ≥61° C., or ≥62° C., or ≥63° C., or ≥64° C., or ≥65° C.

In one embodiment, the ethylene conversion is ≥28%, or ≥29%, or ≥30%, or ≥31%. In one embodiment, the ethylene is fed to a first reaction zone (1) and to two or more subsequent reaction zones, zone n, and zone n+1 or zone n+2, where n>1, and wherein the ethylene comprises fresh ethylene and recycle ethylene, and wherein at least two of the following ratios are met:

a) for reaction zone n, the ratio, Rn, of "mole fraction of fresh ethylene fed to the first reaction zone (RZ1)" to "mole fraction of fresh ethylene fed to reaction zone n (RZn)" is (Rn=RZ1/RZn) from 0 to 1;

b) for reaction zone n+1, the ratio, Rn+1, of "mole fraction of fresh ethylene fed to the first reaction zone (RZ1)" to "mole fraction of fresh ethylene fed to reaction zone (RZn+1)" is (Rn+1=RZ1/RZn+1) from 0 to 1;

c) for reaction zone n+2, the ratio, Rn+2, of "mole fraction of fresh ethylene fed to the first reaction zone (RZ1)" to "mole fraction of fresh ethylene fed to reaction zone (RZn+2)" is (Rn+2=RZ1/RZn+2) from 0 to 1; and wherein the "total amount of ethylene fed to the polymerization process" derives from at least one fresh ethylene stream and at least one recycled ethylene stream.

In one embodiment, the ethylene is fed to a first (1) and one subsequent reaction zone, and wherein the following conditions are met:

a) the first ethylene based feed streams to the reactor does not contain fresh ethylene;

b) the ethylene based feed to a subsequent reactor zone contains fresh ethylene;

In one embodiment, the ethylene is fed to a first reaction zone (1) and to two subsequent reaction zones, and wherein the following conditions are met:

a) the first reaction zone does not receive fresh ethylene;

b) the first ethylene based feed to a subsequent reaction zone does not contain fresh ethylene;

c) the second ethylene based feed to a subsequent reaction zone does contain fresh ethylene;

In one embodiment, the ethylene is fed to a first reaction zone (1) and to three subsequent reaction zone, and wherein the following conditions are met:

a) the first reaction zone does not receive fresh ethylene;

b) the second reaction zone does not ethylene receive fresh ethylene.

c) the third ethylene based feed flow contains optionally fresh ethylene d) the fourth ethylene based feed flow contains fresh ethylene.

In one embodiment, the first ethylene feed stream comprises from 0 to 100 mole % of the total fresh CTA added to the polymerization, and wherein the activity of the CTA system in the first ethylene feed is greater than, or equal to, the activity of the CTA system in each subsequent ethylene feed.

In one embodiment, the first ethylene feed stream comprises from 20 to 100 mole %, or from 25 to 100 mole %, or from 30 to 100 mole %, or from 35 to 100 mole %, or from 40 to 100 mole %, or from 45 to 100 mole %, or from 50 to 100 mole % of the total amount of fresh CTA added to the polymerization. In a further embodiment, the activity of the CTA system in the first ethylene feed is greater than, or equal to, the activity of the CTA system in each subsequent ethylene feed. In one embodiment, the first ethylene feed stream comprises from 20 to 100 mole %, or from 25 to 100 mole %, or from 30 to 100 mole %, or from 40 to 100 mole %, or from 45 to 100 mole %, or from 50 to 100 mole % of the total amount of CTA fed to the polymerization, and wherein the activity of the CTA system in the first ethylene feed is greater than, or equal to, the activity of the CTA system in each subsequent ethylene feed. In one embodiment, the first ethylene feed stream comprises from 20 to 100 mole %, or from 25 to 100 mole %, or from 30 to 100 mole %, or from 40 to 100 mole %, or from 45 to 100 mole %, or from 50 to 100 mole % of the total amount of fresh CTA added to the polymerization, and wherein the activity of the CTA system in the first ethylene feed is equal to the activity of the CTA system in the second ethylene feed.

In one embodiment, the first ethylene feed stream comprises from 20 to 100 mole %, or from 25 to 100 mole %, or from 30 to 100 mole %, or from 40 to 100 mole %, or from 45 to 100 mole %, or from 50 to 100 mole % of the total amount of fresh CTA added to the polymerization, and wherein the activity of the CTA system in the first ethylene feed is greater than the activity of the CTA system in the second ethylene feed.

In one embodiment, the first ethylene feed stream comprises from 20 to 100 mole %, or from 25 to 100 mole %, or from 30 to 100 mole %, or from 40 to 100 mole %, or from 45 to 100 mole %, or from 50 to 100 mole % of the total amount of CTA added to the polymerization, and wherein the activity of the CTA system in the first ethylene feed is equal to the activity of the CTA system in the third ethylene feed. In one embodiment, the first ethylene feed stream comprises from 20 to 100 mole %, or from 25 to 100 mole %, or from 30 to 100 mole %, or from 40 to 100 mole %, or from 45 to 100 mole %, or from 50 to 100 mole % of the total amount of CTA added to the polymerization, and wherein the activity of the CTA system in the first ethylene feed is greater than the activity of the CTA system in the third ethylene feed.

In one embodiment, the first ethylene feed comprises at least one CTA, and wherein the activity of the CTA system in the first ethylene feed is greater than, or equal to, the activity of the CTA system in each subsequent ethylene feed.

An inventive process may comprise a combination of two or more embodiments described herein.

In one embodiment, the secondary compressor system comprises 3, 6, 9, 12, 15 or 18 plungers operating in the second compression stage. In one embodiment, the secondary compressor system comprises 4, 8, 10, 14, 16 or 20 plungers operating in the second compression stage. In one embodiment the discharges of two plungers are combined for each feed stream. In one embodiment the discharges of two or a multiple of two plungers are combined for each feed stream.

In one embodiment the discharges of the plungers are either i) arranged in a fixed distribution over the ethylene-based feed streams, and wherein, optionally, two or more discharges are combined in this fixed distribution, or ii) controlled during a polymerization, and wherein, optionally, two or more discharges are combined and used as one or more ethylene-based feed streams. In a further embodiment, for option ii), the discharges are controlled using one or more throttle valves and/or splitter valves.

In one embodiment one or more throttle valves and/or splitter valves are used to direct the flow of one or more plunger discharges to the reactor.

In one embodiment, the discharge streams from the secondary compressor system are split up into three ethylene feed streams, each stream has the same amount of molar of ethylene based components.

In one embodiment the total ethylene-based feed flow to the reactor is from 40 to 350 tons per hour, or from 50 to 300 tons per hour, or from 60 to 250 tons per hour. In one embodiment the total ethylene-based feed flow to the reactor from 30 to 400 tons per hour, or from 50 to 400 tons per hour, or from 75 to 400 Tons per hour, or from 10 to 400 tons per hour.

In one embodiment, the invention provides a process for controlling polymer properties, particularly rheological properties such as melt elasticity, G' and melt strength through process conditions like peak temperatures, start and re-initiation temperatures, CTA and fresh ethylene distribution, ethylene-based feed stream to the multiple reaction zones, while maintaining the reactor inlet pressure and conversion level. Melt elasticity, melt strength and/or other rheological properties are each an indicator of MWD or vice versa are influenced by MWD.

In one embodiment the invention provides a high pressure polymerization process to form an ethylene-based polymer, the process comprising at least the following step:

polymerizing a reaction mixture comprising ethylene, using a reactor configuration comprising (A) at least two reaction zones, a first reaction zone (reaction zone 1) and an i reaction zone (reaction zone i where i≥2), (B) at least two ethylene feed streams, each feed stream comprising a percentage of the total make-up ethylene fed to the high pressure polymerization process, in which a first ethylene feed stream is sent to reaction zone 1 and a second ethylene feed stream is sent to reaction zone i, and (C) operating the first reaction zone(s) at very low peak temperature(s).

An inventive process may comprise a combination of two or more embodiments as described herein.

In one embodiment, when the polymerization temperature (the temperature in the reactor, excluding the pre-heater section) is equal to, or less than 180° C., the cooling medium temperature is equal to, or higher than 180° C., or preferably equal to, or higher than 185° C., more preferably equal to, or higher than 190° C., most preferably equal to, or higher than 195° C. In one embodiment, when the polymerization temperature is equal to, or less than 190° C., the cooling medium temperature is equal to, or higher than 180° C., or preferably equal to, or higher than 185° C., more preferably equal to, or higher than 190° C., most preferably equal to, or higher than 195° C. In one embodiment, when the polymerization temperature is equal to, or less than 200° C., the cooling medium temperature is equal to, or higher than 180° C., or preferably equal to, or higher than 185° C., more preferably equal to, or higher than 190° C., most preferably equal to, or higher than 195° C.

In one embodiment the reactor configuration comprises at least one tubular reactor. In one embodiment, the polymerization takes place in one reactor with multiple or at least three reaction zones. In one embodiment, the polymerization takes place in a reactor configuration comprising at least three reaction zones, reaction zone 1 and reaction zone i (i≥2) and wherein reaction zone i is downstream from reaction zone 1. In an embodiment, i is from 2-5, or from 2-4. In an embodiment, i=2.

In one embodiment the only reactors in the reactor configuration are tubular reactors.

In one embodiment, the first reaction zone is a tubular reaction zone. In one embodiment, each reaction zone is a tubular reaction zone.

In one embodiment, the first reaction zone is an autoclave reaction zone.

In one embodiment, i is greater than or equal to 3, or 4, or 5, or 10, or 20, or more.

In one embodiment, the reactor configuration comprises at least one Primary compressor and at least one Booster (Secondary) compressor.

In one embodiment, the process comprises only one Primary compressor.

In one embodiment, the ethylene-based polymer is a polyethylene homopolymer.

In one embodiment, the ethylene-based polymer is LDPE.

In one embodiment, the ethylene-based polymer is an ethylene-based interpolymer comprising at least one comonomer.

In one embodiment, the process comprises 2, or 3, or 4, or 5, or 6, or more ethylene feed streams. In one embodiment, the first and second ethylene feed streams each comprise from 1 to 100 mole percent (mole %), or 5 to 95 mole %, or from 10 to 90 mole %, or from 20 to 80 mole %, or from 30 to 70 mole %, or from 35 to 65 mole %, or from 40 to 60 mole %, or from 45 to 55 mole %, of the total ethylene fed to the process polymerization.

In one embodiment, the ethylene fed to the first reaction zone is at least 10 mole percent of the total ethylene fed to the polymerization. In one embodiment, the ethylene fed to the first reaction zone is 10 to 90 mole percent, or 20 to 80 mole percent, or 25 to 75 mole percent, or 30 to 70 mole percent, or 40 to 60 mole percent of the total ethylene fed to the polymerization. In one embodiment, the ethylene based feed stream is fed to at least three reaction zones, wherein the ethylene based feed stream fed to the first reaction zone is from 25 to 50 mole %, or from 30 to 45 mole %, or from 30 to 40 mole %, or from 32 to 38 mole % of the total ethylene fed to the polymerization.

In one embodiment, the make-up ethylene does not contain a chain transfer agent other than one or more residual compounds originating from the ethylene production-/fractionation process.

In one embodiment, total amount of fresh (make-up) fresh ethylene is distributed to all reaction zones. In one embodiment, the make-up ethylene is only distributed to the reaction zone i (i>1). In one embodiment, total amount of fresh (make-up) CTA is only distributed to the first reaction zone. In one embodiment, total amount of fresh (make-up) CTA is distributed to all reaction zones receiving an ethylene based feed flow.

In one embodiment, each feed to each reaction zone contains the same CTA system. In a further embodiment the CTA system of each feed contains a single CTA.

In one embodiment, each of the polymerization conditions in the reaction zones, independently, comprises a peak temperature <400° C., or <380° C., or <360° C., or <340° C., or <320° C., and an inlet pressure less than 1000 MPa, or less than 500 MPa, or less than 400 MPa, or less than 350 MPa.

In one embodiment, the maximum polymerization temperature in the reaction zone 1, is <260° C., or <255, or <250° C., or <248° C., or <246° C., or <244° C., or <242° C., or <240° C. In one embodiment, the maximum polymerization temperature in the reaction zone 1 and 2, is <260° C., or <255, or <250° C., or <248° C., or <246° C., or <244° C., or <242° C., or <240° C. In one embodiment, the maximum polymerization temperature in the reaction zone 1, 2 and 3, is <260° C., or <255, or <250° C., or <248° C., or <246° C., or <244° C., or <242° C., or <240° C.

In one embodiment, no fresh CTA is distributed to the first reaction zone. In one embodiment, 0 to 100% of the total fresh CTA is distributed to the first reaction zone.

In one embodiment, the reactor configuration comprises at least one tubular reactor, and each tubular reactor has one or more cooling zones. In one embodiment the average process velocity of reaction zone i is from 10 to 20 msec, or from 12 to 20 msec, or from 12 to 18 msec. In one embodiment, the reactor configuration comprises at least one tubular reactor, and each tubular reactor has one or more heat transfer zones. In one embodiment, the reactor configuration comprises at least one tubular reactor, and each tubular reactor is equipped with multiple heat transfer zones, and where heat is exchanged between the process side and a heat transfer medium.

In one embodiment, the reactor configuration comprises at least one tubular reactor, and the cooling and/or heating to each reactor, is provided by pressurized liquid water operating in a co-current mode and/or counter current mode, in multiple cooling zones surrounding the reactor. In one embodiment, the reactor configuration comprises at least one tubular reactor, and the heating to each reactor, is provided by pressurized steam.

In one embodiment, the reactor configuration comprises at least one tubular reactor, and the cooling and/or heating to each reactor, is provided by a liquid heat transfer fluid (for example, a silicon oil and/or a polygycol (e.g., DOWTHERM fluids)), operating in a co-current mode and/or counter current mode, in multiple cooling zones surrounding the reactor.

In one embodiment, high pressure reactor tubes used for the reactor assembly are typically equipped with a jacket to allow heat transfer with the help of heat transfer medium flowing through this jacket. In one embodiment, the reactor configuration comprises at least one tubular reactor, and each tubular reactor is equipped with multiple jackets, and wherein each jacket has one inlet and one outlet, and wherein the respective inlets and outlets of the two or more jackets are connected in series, to each other, to form one heat transfer zone. In a further embodiment, the inlet temperatures of the heat transfer zones are uniform, and each inlet temperature is from 20 to 240° C. In another embodiment, at least two inlet temperatures of the heat transfer zones are uniform, and wherein each inlet temperature is from 20 to 240° C. In another embodiment, each inlet temperature of a heat transfer zone is different from the inlet temperatures of the other heat transfer zones, and each inlet temperature is from 20 to 240° C.

In one embodiment, the reactor configuration comprises at least one tubular reactor, and each tubular reactor is equipped with multiple jackets, and wherein each jacket has one inlet and one outlet, and wherein the inlets and outlets of multiple jackets are connected in series, to each other, to form one or more heat transfer zones. In a further embodiment, the inlet temperatures of the heat transfer zones are uniform, and each inlet temperature is from 20 and 240° C. In another embodiment, at least two inlet temperatures of the heat transfer zones are uniform, and wherein each inlet temperature is from 20 and 240° C. In another embodiment, each inlet temperature of a heat transfer zone is different from the inlet temperatures of the other heat transfer zones, and each inlet temperature is from 20 and 240° C.

In one embodiment the maximum discharge pressure of the secondary compressor system is limited at ≤3100 bar, or ≤3000 bar, or ≤2900 bar, or ≤2800 bar, or ≤2700 bar, or ≤2600 bar, or ≤2500 bar, or ≤2500 bar, or ≤2400 bar, or ≤2300 bar.

In one embodiment the throughput of the secondary compressor system is maximized to meet the design load of the secondary compressor system when operating at maximum discharge pressure. In one embodiment the throughput of the secondary compressor system is maximized to meet the maximum load (mechanical or electrical) of the drive of the secondary compressor system when operating at maximum discharge pressure.

In one embodiment the throughput of the secondary compressor system is maximized by maximizing plunger and/or cylinder size in order to meet the design load of the secondary compressor and/or the maximum load (mechanical or electrical) of the drive of the secondary compressor system when operating at maximum discharge pressure.

In one embodiment two or more plunger discharges, are combined to form one reactor feed, and wherein these plungers are out of phase. Such arrangement allows for the reduction in flow fluctuations and pressure pulsations in the compressor discharge lines and reactor feed lines. In one embodiment, the discharges from 2, 3 or 4 plungers are aligned to one ethylene-based reactor feed, and wherein these discharges are out of phase to each other. In one embodiment, the discharges from the multiples of 2 or 3 or 4 plungers are aligned to one reactor feed, and wherein the discharges in each multiple are out of phase. In one embodiment discharges of two or more plungers are aligned to one ethylene-based reactor feed, and wherein these discharges are out of phase to each other. In one embodiment, the discharges from the multiples of 2 or more plungers are aligned to one reactor feed, and wherein the discharges in each multiple are out of phase.

In one embodiment, the mixture further comprises at least one CTA selected from an aldehyde, an alkane, an acetate, a ketone, an alcohol, an ester, a mercaptan, a phosphine, a phosgene, an alpha-olefin, or a combination thereof. In one embodiment, the mixture further comprises at least one CTA selected from an aldehyde, an alkane, a ketone, an alcohol, an ester, an alpha-olefin, or a combination thereof.

In one embodiment, the total ethylene based feed flow to the reactor configuration is from 30 to 400 tons per hr, or from 50 to 400 tons per hour, or from 75 to 400 tons per hour, or from 100 to 400 tons per hour. In one embodiment, the total ethylene based feed flow to the reactor configuration is from 40 to 350 tons per hour, or from 50 to 300 tons per hour.

In one embodiment, the ethylene-based polymer has a melt index (I2) from 0.10 to 20.0 g/10 min.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4 methyl-1-pentene and combinations thereof. Preferably, the α-olefin comonomers are selected from propylene, 1-butene and combinations thereof. In one embodiment, the ethylene-based polymer is a LDPE.

Initiators

Free radical initiators are generally used to produce the inventive ethylene-based polymers. A free radical initiator, as used here, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. Furthermore oxygen can be used as initiator. In one embodiment, these organic peroxide initiators are used in an amount from 0.001 to 0.2 wt %, based upon the weight of polymerizable monomers. Peroxide initiator can be characterized and classified with their half-life temperature at certain time intervals. For instance the half-life temperature at 0.1 h indicates the temperature at which an initiator is dissociated into radicals for 50% in 0.1 h (or 6 minutes).

AkzoNobel show in their brochure "Initiators and Reactor Additives for Thermo-plastics" half-life temperatures at 0.1, 1.0 and 10 hour for their commercial organic peroxide initiators. Due to typical residence times of less than five minutes in high pressure reactor system and less than two minutes in the individual reactor zones the half-life temperature at 0.1 h are relevant for the classification and selection of organic peroxide initiators. The Organic peroxides can be classified in the following classes: Class 1: Low temperature initiator, with half-life temperature at 0.1 hour, varying from 70 to 120° C. These peroxides are typically used to start; Class 2: Medium temperature initiator, with half-life temperature at 0.1 hour, varying from 120 to 150° C.; Class 3: High temperature initiator, with half-life temperature at 0.1 hour, above 150° C. Oxygen is thought to work through formation of intermediate organic hydroperoxides, which will typically decompose at temperatures starting at 180° C., therefore oxygen can be considered as a high temperature initiator (Class 3).

Organic peroxides are often applied in mixtures of low and high temperature initiators, in order to start and/or accelerate temperature development by the lowest temperature initiator class, while the control temperature, respectively maximum zone temperature for autoclave reaction zone and maximum peak temperature for tubular reactor zone, is controlled and determined by the highest temperature initiator class.

The temperature control of a reaction zone is therefore a function of the molar sum of initiators of the highest temperature class, fed into each zone, and can be further affected by the efficiency, in which the applied higher temperature peroxides will dissociate into or generate polymerization radicals. The mixture of single or multiple initiators, potentially diluted with a solvent, injected into a reaction zone i is called initiation system for reaction zone i. In one embodiment oxygen is used alone, or in combination with other initiators, as a high temperature initiator. In one embodiment the initiator usage and efficiency are affected by the so-called cage-in effect or potential to form effective polymerization radicals.

In one embodiment, an initiator is added to at least one reaction zone, and the initiator has a half-life temperature, at one second, greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6, 6,9,9-hexamethyl-1,2,4,5-tetroxonane) available from United Initiators. See also International Publication Nos. WO 02/14379 and WO 01/68723.

In one embodiment, the polymerization pressure, as measured at the first inlet of the reactor, is from 1000 bar to 4000 bar, or from 1400 to 3600 bar, or from 1800 to 3200 bar.

Depending on the final article processing step and the end-usage, different product quality targets are set for each product grade. Melt-index, density and melt elasticity are the main parameters to describe and to measure the product quality and the consistency of the produced product. Melt index reflects the average molecular weight and can be adjusted and/or controlled through varying the level and contribution of CTA systems. The short chain branching (SCB) level is an indicator for product density, which is typically allowed varying in certain ranges, for instance 0.924±0.010 g/cm$^3$. The long chain branching (LCBf) level strongly affects the molecular weight distribution, and consequently the viscoelastic properties, for instance melt strength, and is important in applications, such as blown and cast film, foam, extrusion coating etc. Properties like SCB and LCB level are strongly affected by the applied polymerization temperature and pressure levels. Additionally the LCB level is also affected by the polymer level profile in the reactor system.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer. In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers, polymer blends and compositions of this invention may be employed in a variety of conventional thermoplastic fabrication processes to produce useful articles, including extrusion coating onto various substrates; monolayer and multilayer films; molded articles, such as blow molded, injection molded, or rotomolded articles; coatings; fibers; and woven or non-woven fabrics. An inventive polymer may be used in a variety of films, including but not limited to, clarity and/or shrink films, collation shrink films, cast stretch films, silage films, stretch hood, sealants, and diaper back sheets. Other suitable applications include, but are not limited to, wires and cables, gaskets and profiles, adhesives; footwear components, and auto interior parts.

The invention also provides an ethylene-based polymer made by an inventive process. In one embodiment, the ethylene-based polymer is a polyethylene homopolymer. In one embodiment, the ethylene-based polymer is an ethylene-based interpolymer. In one embodiment, the ethylene-based polymer is LDPE. In one embodiment, the ethylene-based polymer has a density from 0.910 to 0.940 g/cm$^3$. In one embodiment, the ethylene-based polymer has a melt index from 0.1 to 1000 g/10 min. In one embodiment, the ethylene-based polymer has a density from 0.910 to 0.940 g/cm$^3$, and a melt index from 0.1 to 1000 g/10 min. In one embodiment, the ethylene-based polymer has a density from 0.910 to 0.940 g/cm$^3$, and a melt index from 0.1 to 100 g/10 min. In one embodiment, the ethylene-based polymer has a density from 0.910 to 0.940 g/cm$^3$, and a melt index from 0.1 to 50 g/10 min. In one embodiment, the ethylene-based polymer has a density from 0.910 to 0.940 g/cm$^3$, and a melt index from 0.1 to 20 g/10 min. In one embodiment, the ethylene-based polymer has a density from 0.910 to 0.940 g/cm$^3$, and a melt index from 0.2 to 20 g/10 min. An inventive polymer may comprise a combination of two or more embodiments as described herein.

The invention also provides a composition comprising an inventive ethylene-based polymer. In one embodiment, the composition further comprises another ethylene-based polymer. The invention also provides an article comprising at least one component formed an inventive composition. In one embodiment, the article is an extrusion coating resin. In another embodiment, the article is a film. In another embodiment, the article is an insulation material and/or a protection layer around a metal wire. In another embodiment, the article is foam. An inventive article may comprise the combination of two or more embodiments as described herein.

In one embodiment, $Z_1/Z_i$ is controlled to be greater than 1. In one embodiment, $Z_1/Z_i$ is controlled to be less than 1. In one embodiment, $Z_1/Z_i$ is controlled to be from 0.2 to 2.0, or from 0.3 to 1.8, or 0.4 to 1.6 or 0.5 to 1.5.

In one embodiment, the throughput of the secondary compressor system is maximized to meet the design load of the secondary compressor system when operating at maximum discharge pressure. In one embodiment the throughput of the secondary compressor system is maximized to meet the maximum load (mechanical or electrical) of the drive of the secondary compressor system when operating at maximum discharge pressure. In one embodiment the throughput of the secondary compressor system is maximized by maximizing plunger and/or cylinder size in order to meet the design load of the secondary compressor and/or the maximum load (mechanical or electrical) of the drive of the secondary compressor system when operating at maximum discharge pressure.

Definitions

Unless stated to the contrary, implicit from the context, or customary in the art, all parts and percents are based on weight, and all test methods are current as of the filing date of this application.

The terms "ethylene feed stream" or "ethylene based feed" or "ethylene based feed stream," or "ethylene feed," as used herein, refer to a feed stream to a reaction zone, and which contains a majority amount of ethylene, based on the molar amount of all of the components in the feed stream. Optionally one of more chain transfer agents, comonomers, other process components (like lubrication oil, solvent, etc.) and/or impurities (as for instance initiator degradation products) might be present in the feed stream.

The term "total ethylene based feed flow", as used herein, refers the sum of all ethylene-based feed flows fed to the reactor configuration.

The term "ethylene-based feed components," as used herein, refer to ethylene (fresh and/or recycled), and optionally CTA (fresh and/or recycled), solvent (fresh and/or recycled), comonomer(s) (fresh and/or recycled) and/or other components (for example, including, but not limited to, fresh and/or recycled lubrication oil(s), antioxidant(s), ethane, methane and/or initiator dissociation products), added to a reaction zone at an inlet to the reaction zone. In one embodiment, the ethylene-based feed components comprise the following: ethylene (fresh and/or recycled), and optionally CTA (fresh and/or recycled), solvent (fresh and/or recycled), comonomer(s) (fresh and/or recycled) and/or other components selected from the following: fresh and/or recycled lubrication oil(s), antioxidant(s), ethane, methane and/or initiator dissociation products. In another embodiment, the ethylene-based feed components comprise the following: ethylene (fresh and/or recycled), and optionally CTA (fresh and/or recycled), solvent (fresh and/or recycled), comonomer(s) (fresh and/or recycled) and/or other components selected from the following: fresh and/or recycled lubrication oil(s), antioxidant(s), ethane, methane, initiators (for example, oxygen) and/or initiator dissociation products.

The term "LCB content" refers to a level of long chain branches per 1000 carbons (total carbons) incorporated in the polymer. The LCB content is calculated with the help of kinetics on "Transfer to Polymer" and "Propagation" of ethylene and optionally present comonomers. Comonomers containing a C=C double bond are represented in the calculation of the LCB level per 1000 C by their two carbons in their double bond group. The LCB content can be given as level in the final polymer (final product LCBf), in the progressing polymer formation along the reactor (cumulative LCBf) or in the locally formed polymer as function of the local polymerization conditions in the reactor (local LCBf).

The term "ethylene conversion" or "ethylene conversion level", as used herein, refers to weight fraction of the ethylene fed to the reactor, which is incorporated in the final polymer produced.

The term "composition," as used herein, includes a mixture of materials which comprise the composition, as well as reaction products and decomposition products formed from the materials of the composition.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer. Trace amount of impurities can include initiator residues and other components, like for instance lubrication oil, solvent etc., showing chain transfer activity.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer.

The term "ethylene-based interpolymer" refers to an interpolymer that comprises a majority amount of polymerized ethylene, based on the weight of the interpolymer, and at least one comonomer.

The term "ethylene-based copolymer" refers to a copolymer that comprises a majority amount of polymerized ethylene, based on the weight of the copolymer, and a comonomer as the only monomer types.

The term "long chain branching frequency (LCBf)" used herein refers to the ratio, described below, relating to the transfer to polymer steps, leading to long chain branches per 1000 C-atoms (or 500 ethylene units) converted in polyethylene. Typically LCBf is the average number of the whole polymer. This ratio can be determined via NMR or be calculated via simulations. The numbers used herein are derived by simulations. The LCBf derived by simulations is the ratio of transfer to polymer reaction $R_{LCB}$ rate and the propagation rate $R_p$, and multiplied the ratio by 500 for the conversion of one ethylene unit incorporated to 1000 carbon atoms incorporated. $R_{LCB}=k_{LCB}*[Rad]*[Pol]$ and $R_p=k_p*[Rad]*[Ethylene]$. The ratio $R_{LCB}/R_p$ only would indicate the frequency of LCB-formation per one ethylene unit converted. To derive the total LCBf of the whole polymer, the ratio has to be integrated over the temperature, pressure and conversion profile of the used reactor. This is typically done in a simulation software like Predici by CiT or similar programs, which are able to solve differential equations.

The term "high pressure polymerization process," as used herein, refers to a free radical polymerization process carried out at an elevated pressure (inlet pressure) of at least 1000 bar (100 MPa).

The terms "inlet stream" or "reaction zone inlet stream," as used herein, refer to the total mass flow or total molar flow at the inlet of a reaction zone, and consists of the mass flow or molar flow transferred from the previous reaction zone plus optional ethylene based feed streams, plus optionally CTA feed stream, plus optionally initiator feed stream fed optionally alone or together with another feed stream. The terms "side stream" or "side feed stream," as used herein, refer to the ethylene based feed stream, CTA system feed stream, and/or initiator system, to sequential reaction zones.

The term "reactor system," as used herein, refers to the devices used to polymerize and isolate a polymer. Such devices include, but are not limited to, one or more reactors, reactor pre-heater(s), monomer-reactor cooling device(s), Secondary compressor(s) (or Hyper compressor(s)), Primary compressor(s), and/or Booster compressor(s). The term "reactor configuration," as used herein, refers to one or more reactors, and optionally one or more reactor pre-heaters, used to polymerize a polymer. Such reactors include, but are not limited to, autoclave reactor(s), tubular reactor(s), and combinations of autoclave and tubular reactors.

The term "inlet pressure" or "reactor inlet pressure", as used herein, refers to the pressure level at the first inlet of the first reaction zone.

The term "reaction zone," as used herein, refers to a reactor zone where polymerization reaction is initiated or reinitiated by the addition of free radicals or components which dissociate into and/or generate free radicals. Typically, the reaction medium is heated and/or cooled by a heat transfer medium flowing through a jacket around the reactor. A reaction zone may also start with the addition of fresh and/or recycled ethylene, and/or free radicals or components which dissociate into and/or generate free radicals. The term "first reaction zone," as used herein, refers to the first reactor zone where the polymerization is initiated by the addition of radicals and/or components which dissociate into and/or generate radicals. The first reaction zone ends at the point where there is a new feed of radicals, and/or components which dissociate into and/or generate radicals, and, optionally, fresh and/or recycled ethylene and/or comonomer(s).

The phrase "maximum temperature for a reaction zone," or "peak temperature," as used herein, refers to the highest temperature measured in a reaction zone, for example, in an autoclave reaction zone (typically, noted as a maximum zone temperature), in a tubular reaction zone (typically noted as a peak temperature).

The phrase "average polymerization temperature of reaction zone i", as used herein, refers to the average of the re-initiation and the peak temperature of reaction zone i. The phrase "average polymerization temperature of the first 40 wt % polymer formed", as used herein, refers to the average polymerization temperature over the reactor section in which the initial 40% wt of the final amount of polymer is produced. The phrase "average polymerization temperature of the last 60 wt % polymer formed" as used herein, refers to the to the average polymerization temperature in the reactor section in which the last 60 wt % of the total polymer is produced. This section starts at the end of the reactor section where the first 40% of the final polymer is produced.

The term "hyper compressor inlet pressure" as used herein refers to the pressure at the suction side of the hyper compressor system.

The term "secondary compressor system," as used herein, refers to one or more compressors plus optional coolers, that are used to compress a gaseous feed in two compression stages, namely a first compression stage and a second compression stage;

typically an ethylene based feed stream is compressed from the suction pressure of the secondary compressor system, to the first compression stage discharge pressure, and is further compressed in the second compression stage, to the final discharge pressure of the secondary compressor system. The outlet of first compression stage in combination with the inlet of second compression stage, plus optional cooler(s), is also called the "interstage" of the secondary compressor system. Typically the first compression stage compresses from a suction pressure, in the range from 100 to 350 bar, to an interstage pressure, in the range from 800 to 1600 bar. Typically, the second compression stage compresses from an interstage pressure, as described above, to a final discharge pressure, in the range from 2000 to 3600 bar.

The term "plunger," as used herein, refers to a reciprocating pressurization device, within a cylinder assembly, compressing a gaseous feed (for example, an ethylene based feed) from the suction pressure to interstage pressure of the secondary compressor system, or from the interstage pressure to final discharge pressure of the secondary compression system. Typically the sizing of a plunger and a cylinder assembly are uniform within a compression stage (first or second) of a secondary compressor system, but differ between the first and second compression stages of a secondary compressor system. Each plunger is housed inside a cylinder assembly.

The term "pulsation" refers to the non-uniform flow conditions in the discharge of the plunger, caused by a reciprocating operation, including a filling and delivery stage of the plunger assembly during each rotation turn of the driving shaft of the compressor. The non-uniform flow pattern causes varying pressure drop in the discharge system, and therefore fluctuating pressure conditions in the compressor discharge and ethylene based fees stream. When two or more plunger discharges are combined, care should be taken to ensure that the flow patterns caused by the discharges of different plungers, used to form one ethylene-based reactor feed stream, are not overlapping, thus minimizing the differences in minimum and maximum flow and in pressure fluctuations in the feed line to the reactor. Preferably the flow patterns are complementary (or out of phase) to each other. Preferably the plungers, which are aligned to one ethylene-based reactor feed stream should be out of phase and/or multiples of 3 or 4 plunger combinations aligned to the ethylene based reactor feed stream.

The term "maximum load allowed" of a secondary compressor system refers to the maximum mechanical force (load) that can be applied at the compressor frame and/or components associated with the cylinders, the plungers, and the connecting and driving shaft assemblies. The "maximum load allowed" is determined by the weakest component. The maximum load is determined by the manufacturer design pressure of the components, as well as by the inertial forces during operation.

The term "maximum electrical load" of a secondary compressor system, refers to the maximum power that an electrical motor, driving the compressor, is allowed to deliver in continuous operation, based on the manufacturer design of the motor.

The term "splitter valve," refers to a device controlling the distribution of a feed flow (for example, an ethylene-based feed stream) from the secondary compressor system, and to two or more reactor zones. The term "throttle valve," refers to a control valve that can be used to increase or decrease a flow through a line.

Secondary compressor or Hyper compressor, is a device that compresses a feed stream; for example, at least one of the following: a) the ethylene-based components coming from the HPR (High Pressure Recycle), and/or b) the ethylene-based components, each coming from the Primary, each to a pressure level required to feed the reactor at its inlet pressure. This compression can take place in one or multiple compression stages, and can be combined with intermediate cooling. The Hyper comprises a reciprocating plunger compressor, and can consist of single or multiple compressor frame(s).

The term "secondary compressor throughput," as used herein, refers to the net amount of feed components, for example, ethylene-based feed components, compressed and fed to the reactor configuration. The secondary throughput is a function of the compression volume and the density of the feed components, for example, ethylene based components, at the suction side. The pressure and temperature conditions at the suction side of the secondary compressor will define the density of the feed components, for example, ethylene based components, to be compressed. The term "discharge stream," as used herein, refers to the stream coming from the discharge of a compressor (for example, a secondary compressor).

The term "fresh," when used herein, in reference to an ethylene-based feed component (i.e., "fresh ethylene," "fresh CTA"), refers to reactant provided from an external source(s), and not provided internally from a recycled source(s). For example, in an embodiment, fresh ethylene is used as "make-up ethylene" required to compensate for the ethylene consumed by the polymerization and/or lost through, for example, ethylene purge from the process and residual ethylene in the polymer. The term "recycled," when used herein, in reference to a reactant (i.e., "recycled ethylene," "recycled CTA"), refers to unreacted reactant separated from the polymer in the high pressure separator(s) and/or the low pressure separator(s), and returned/compressed to the reactor.

The terms "feed," "feed flow," or "feed stream," as used herein, refer to fresh and/or recycled components (for example, ethylene, initiator, CTA, and/or solvent) added to a reaction zone at an inlet.

The term "mole fraction," as used herein, refers to the molar ratio of one component in a mixture to the total moles of the components of the mixture. Molar fraction can be determined by calculating the ratios of molar amounts or molar flows. The phrase "mole fraction of fresh ethylene fed to the first reaction zone (RZ1)," as used herein, refers to the molar amount of fresh ethylene fed (via a front stream) to the first reaction zone, divided by the molar amount of ethylene plus optional comonomer(s) plus optional CTA(s) fed (via a front stream) to the first reaction zone. The phrase "mole fraction of fresh ethylene fed to the nth reaction zone (RZn)," as used herein, refers to the molar amount of fresh ethylene fed (via a side stream) to the nth reaction zone divided by the molar amount of ethylene plus optional comonomer(s) plus optional CTA(s) fed (via a side stream) to the nth reaction zone.

The term "CTA system" includes a single CTA, or a mixture of CTAs, added to the polymerization process, typically to control the melt index. A CTA system includes a component able to transfer a hydrogen atom to a growing polymer molecule containing a radical, by which a radical is formed on the CTA molecule, which can then initiate a new polymer chain. CTA is also known as telogen or telomer. The terms "CTA activity" or "chain transfer activity coefficient (Cs value)" as used herein, refer to the ratio between the "rate of chain transfer" to the "rate of ethylene propagation." See Mortimer references provided in the experimental section below.

The terms "Z1/Zi" as used herein is determined as follows. The "reactor zone molar concentration of a $CTA_j$ in a reactor zone i ($[CTA]_{ji}$)" is defined as the "total molar amount of that CTA fed (excluding a transfer from a previous reaction zone) into reactor zones k=1 to k=i" divided by the "total molar amount of ethylene fed (excluding a transfers from a previous reaction zone) into reactor zones 1 to i." Note i≥1. This relationship is shown below in Equation AC.

$$[CTA]_{j_i} = \frac{\sum_{k=1}^{i} n_{CTA,j_k}}{\sum_{k=1}^{i} n_{eth_t}}. \quad \text{(Eqn. AC)}$$

In Equation AC, $j \geq 1$, $n_{CTA,j_k}$ is the "amount of moles of the jth CTA freshly injected to the kth reactor zone (where k=1 to i)," and $n_{eth_k}$ is the "amount of moles of ethylene freshly injected to the kth reactor zone (where k=1 to i)."

The "transfer activity of a CTA (system) in a reactor zone I (Zi)" is defined as the "sum of the reactor zone molar concentration of each CTA in the reactor zone" multiplied with its chain transfer activity constant (Cs)—see Equation BC. The chain transfer activity constant (Cs) is the ratio of reaction rates Ks/Kp, at a reference pressure (1360 atm) and a reference temperature (130° C.). This relationship is shown below in Equation BC, where $n_{compi}$ is the total number of CTAs in reactor zone i. Note i≥1, and $n_{compi}$≥1.

$$Z_i = \sum_{j=1}^{n_{compi}} [CTA]_{j_i} \cdot C_{s,j}. \quad \text{(Eqn. BC)}$$

The term "Rn=RZ1/RZn", as used herein, refers to, for reaction zone n, the ratio of the "mole fraction of fresh ethylene fed to the first reaction zone (RZ1)" to the "mole fraction of fresh ethylene fed to reaction zone n (RZn)".

For the polymerization of ethylene homopolymers, the RZ1 and RZn values are determined as follows—see Equations AE and BE below.

$$RZ1 = \frac{n_{fresh,eth,1}}{n_{fresh,eth,1} + n_{eth,1}}, \quad \text{(Eqn. AE)}$$

$$RZn = \frac{n_{fresh,eth,n}}{n_{fresh,eth,n} + n_{eth,n}} (n \geq 2), \quad \text{(Eqn. BE)}$$

where $n_{fresh,eth,1}$ is molar flow of fresh ethylene (from Primary) fed to reaction zone 1 [mol/hr], $n_{fresh,eth,n}$ is molar flow of fresh ethylene (from Primary) fed to reaction zone n [mol/hr], $n_{eth,1}$ is molar flow of ethylene from HPR recycle fed to reaction zone 1 [mol/hr], $n_{eth}$ is molar flow of ethylene from HPR fed to the reaction n [mol/hr].

Equation AE and Equation BE, as used herein, to calculate RZ1 and RZn, assume that 60 mol % of the overall ethylene based feed stream to the reactor is from the high pressure recycle (HPR) flow. The remainder 40 mol % of the ethylene based feed stream is from the Primary, which includes fresh ethylene and low pressure recycle (LPR) flow. Fresh ethylene is 33.3 mol %, which includes ethylene converted and lost by purge flow. Thus the Low Pressure Recycle (LPR) flow is 6.7 mol % which includes ethylene from LPR and secondary compressor gland leaks.

The term "initiator system" includes a single initiator, or a mixture of initiators, each typically dissolved in a solvent (for example, a hydrocarbon solvent) added to the polymerization process. The term "injection point," as used herein, refers to the inlet location of a device (used in a polymerization process) where a feed stream is added into the device. The term "feed conditions", as used herein, refers to the flows in moles of the components fed to the reactor, for instance ethylene, CTA, initiators and/or co-monomer(s). The term "maximum outlet temperature" or "before let down temperature" as used herein, refers to the maximum temperature at the end of the last reaction zone.

The term "process velocity in reaction i", as used herein, is the volume flow of process or ethylene-based component divided by the cross-section area of the reactor tube, used in a reaction zone, and is calculated as follows:

$$v_i = \frac{4 \times \phi_i}{\pi d_i^2} \text{ [m/s]}, \quad \text{(Eqn. VA)}$$

where $\phi_i$ [m³/s] is the volume flow of total components (including monomer, comonomer, CTA, impurities, etc.) fed to the reaction zone i, calculated by dividing the total mass flow fed to reaction i to the density of the flow; and $d_i$ [m] is the internal tube diameter of the reactor zone i. The term "average process velocity in reaction zone i" refers to the process velocity averaged over the length of reaction zone i.

Test Methods

Melt Index—

Melt index, or I2, is measured in accordance by ASTM D 1238, Condition 190° C./2.16 kg, and is reported in grams eluted per 10 minutes. The I10 is measured in accordance with ASTM D 1238, Condition 190° C./10 kg, and is reported in grams eluted per 10 minutes.

13C NMR for Branching

Sample Preparation:

Each polymer sample is prepared for 13C NMR by adding approximately 2.7 g of a 50/50 mixture of tetrachloroethane-d2/orthodichlorobenzene containing 0.025 M Cr(AcAc)$_3$ as a relaxation agent, to 0.25 g sample in a Norell 1001-7 10 mm NMR tube. The sample is dissolved and homogenized by heating the tube and its contents to 150° C. using a heating block and heat gun.

Data Acquisition Parameters:

The data are collected using a Bruker 400 MHz spectrometer, equipped with a Bruker Dual DUL high-temperature CryoProbe. The data are acquired using 1280 to 2560 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for seven minutes prior to data acquisition. The $^{13}$C NMR chemical shifts are internally referenced to the EEE triad at 30.0 ppm.

LDPE contains many types of branches; for example, 1,3-diethyl, ethyl branches on a quaternary carbon (gem diethyls), C4, C5 and longer, and if butene or propylene is used, isolated C2 branches (from butene) or C1 (methyl, from propylene) branches are observed. All branching levels are determined by integrating the spectrum from about 40 ppm to 5 ppm, and setting the integral value to 1000, then integrating the peaks associated with each branch type, as shown in the Table A below. The peak integrals then represent the number of each branch type per 1000 C in the polymer. The last column in Table A describes the carbon associated with each integral range. A direct measurement of C6+ branches in LDPE is given, where the long branches are not distinguished from "chain ends". This value represents a level of branching which is defined differently than in LLDPE, HDPE, and other linear polymers. The 32.2 ppm peak, representing the 3rd carbon from the end of all chains or branches of 6 or more carbons is used. In order to derive the number of C6+ branches by the long chain branching mechanism, the measured C6+ number has to be corrected for the presence of both end-groups of the main backbone in the LDPE molecules and the potential use of alpha-olefins with carbon numbers ≥8.

TABLE A

Branching Type and 13C NMR integral ranges used for quantitation

| Branch Type | Peak(s) integrated | Identity of the integrated carbon peak(s) |
|---|---|---|
| 1,3 diethyl | about 10.5 to 11.5 ppm | 1,3 diethyl branch methyls |
| C2 on quaternary carbon | about 7.5 to 8.5 ppm | 2 ethyl branches on a quaternary carbon, methyls |
| C1 | about 19.75 to 20.50 ppm | C1, methyls |
| C4 | about 23.3 to 23.5 ppm | Second $CH_2$ in a 4-carbon branch, counting the methyl as the first C |
| C5 | about 32.60 to 32.80 ppm | Third $CH_2$ in a 5-carbon branch, counting the methyl as the first C |
| C6 or longer (or C6+) | About 32.1 to 32.3 ppm | The third $CH_2$ in any branch of 6 or more carbons in length |

EXPERIMENTAL

Flow Scheme Used for CP1 to CP3, CP1.1 and CP1.2

FIG. 1 shows a generalized flow scheme of a simulated high pressure polymerization plant configuration containing a tubular reactor, where all components from a hyper compressor are sent to the first (front) reaction zone of the reactor, representing "All Front Gas" reactor configuration. Stream (1) is the fresh ethylene make-up, which is compressed together with the outlet of the Booster by the Primary to stream (2). Stream (2) is combined with high pressure recycle stream (18) to stream (3) and send to the inlet of the secondary compressor system (Hyper). The secondary compressor system pressurizes the ethylene feed stream to a sufficient level and feeds the high pressure tubular reactor (Reactor). Stream (4) depicts the CTA system make-up (fresh) feed in this reactor configuration could be fed in the inlet (s), interstage or outlet of the hyper. The CTA system can consist of either a single or multiple components and can include varying compositions. Stream (6) presents a potential comonomer feed. Comonomer streams (6) can be fed in the inlet(s), interstage(s), outlet(s) of the secondary compressor system and/or directly into the reaction zones. The discharge temperature of the secondary compressor system is typically in the range from 60 to 100° C. The ethylene feed to the first reaction zone is typically preheated to a temperature from 130 to 180° C., while the ethylene of the side feed is fed to the reactor at the secondary compressor system discharge temperature or cooled prior to feeding to the reactor.

In the Reactor, the polymerization is initiated with the help of a free radical initiation system(s) injected, and/or activated, at the inlet of each reaction zone. The maximum temperature in each reaction zone is controlled at a set point, by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11), which is sent to the LPS for further separation. Ethylene stream (15) is cooled and cleaned in stream (17). Stream (16) is a purge stream to remove impurities and/or inerts. The polymer separated in LPS is further processed in (12). The ethylene removed in the LPS is fed to the Booster, where, during the compression, condensables such as solvent, lubrication oil, and others components, are collected and removed through stream (14). The outlet of the Booster is combined with make-up ethylene stream (1), and further compressed by the Primary.

Flow Scheme of CP4 to CP6 and IP5.1

Figure 2:
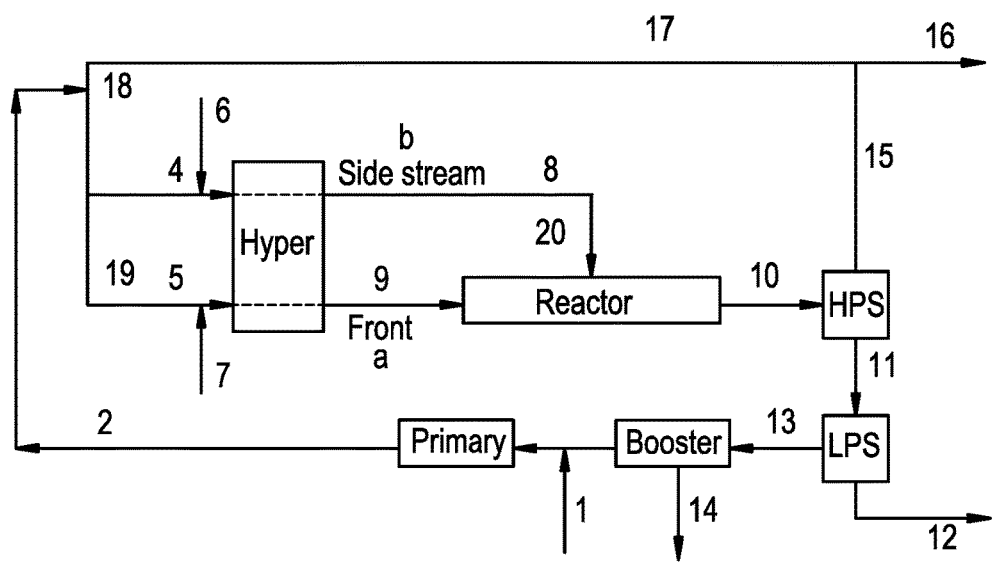
FIG. 2 is a process flow diagram containing a tubular reactor used for comparative polymerization CP4 to CP6 and IP5.1.

FIG. 2 shows a generalized flow scheme of a simulated high pressure polymerization plant configuration containing a tubular reactor. Stream (1) is the fresh ethylene make-up, which is compressed together with the outlet of the Booster by the Primary to stream (2). The primary compressor stream (2) is combined with the high pressure recycle flow (17) to form stream (18). Stream (18) is divided into stream (4) and stream (19). Stream (19) becomes stream (5). Stream (4) and (5) are sent to the secondary compressor system. Comonomer (stream 6 and 7) and make-up CTA (stream 4 and 5) are injected in stream (4) and (5). Discharge stream (9) from the secondary compressor is sent to the first (front) reaction zone, while stream (8) is sent through line (20) as side stream to the inlet of the second reaction zone. Stream (6) and/or stream (7) depict the CTA system make-up (fresh) feed. Optionally comonomer(s) can be fed through stream (6) and/or (7). CTA make-up streams (6) and/or (7) can be fed in the inlet(s), interstage(s), outlet(s) of the secondary compressor system, and/or inlet(s) of the reaction zones. The remaining parts of the scheme are described in the description of FIG. 1.

Flow Scheme Used for IP5.2 and IP5.3

Figure 3:
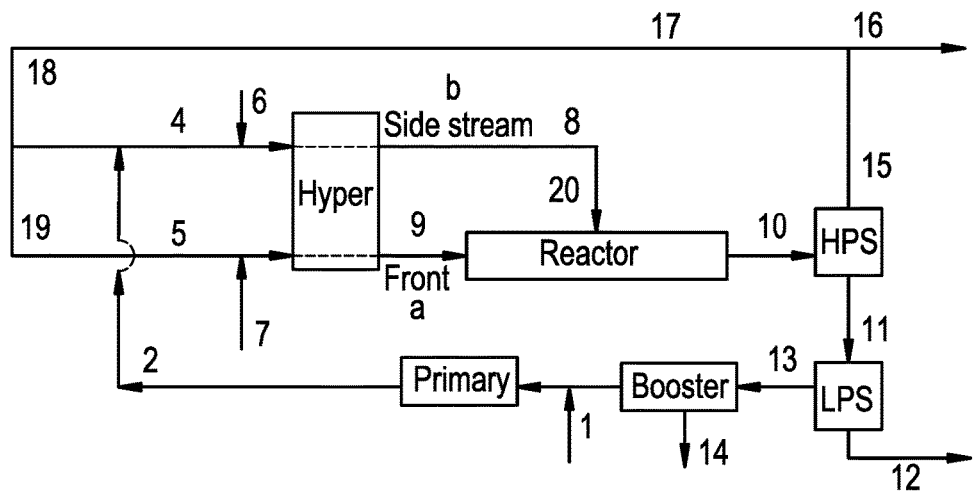
FIG. 3 is a process flow diagram containing a tubular reactor used for comparative polymerization IP5.2 and IP5.3.

FIG. 3 represents the high pressure polymerization in which ethylene is sent to the front (stream 9) and side (stream 20) of the reactor. In FIG. 3, the fresh ethylene in stream (2) coming from the primary compressor is sent to stream (4). All other remaining streams are discussed in the description of FIG. 2 above.

Flow Scheme of CP7 to CP9 and IP8.1

Figure 4:
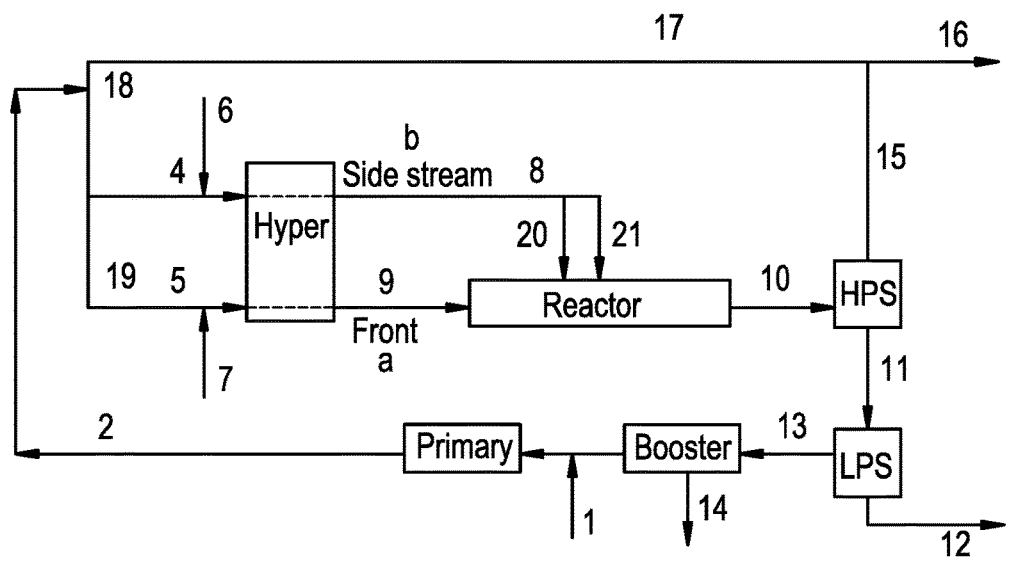
FIG. 4 is a process flow diagram containing a tubular reactor used for comparative polymerization CP7 to CP9 and IP8.1.

FIG. 4 represents the high pressure polymerization in which ethylene is sent to the front (stream 9) and two side inlets (stream (20) and stream (21)) of the reactor. All other remaining streams are discussed in the description of FIG. 2 above.

Flow Scheme of IP8.2 and IP10.2.

Figure 5:
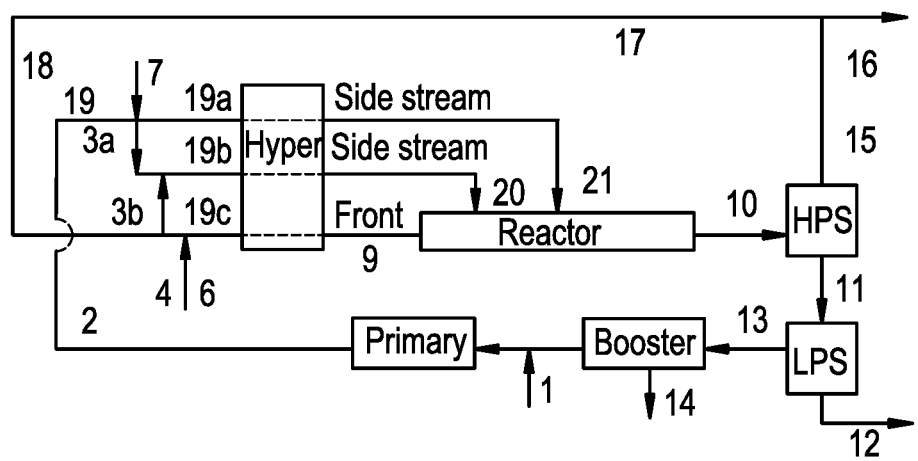
FIG. 5 is a process flow diagram containing a tubular reactor used for comparative polymerization IP8.2 and IP10.2.

FIG. 5 shows a generalized flow scheme of a simulated, high pressure polymerization reactor system containing a tubular reactor, where all components from a hyper compressor are divided over three ethylene-based feed streams to the reactor. Stream (1) is the fresh ethylene make-up, which is compressed together with the outlet of the Booster compressor by the Primary compressor to stream (2). Stream (2) is sent to (19). Stream 19 is sent to stream (19a) and the remaining ethylene from (19) is sent though line (3a) to (19b). The high pressure recycle stream (18) is lined up to stream (19c) and the remaining ethylene from (18) is sent through line (3b) to line (19b). Stream (19c), (19b) and (19a) are compressed by secondary compressor system to reactor inlet pressure and are sent respectively through 9, 20 and 21 to the inlet of the first, the second and the third reaction zones. Stream (4), depicting the CTA system make-up (fresh) feed in this reactor configuration, could also be fed in the inlet(s), interstage or outlet of the secondary compressor system compressing stream (19c). The CTA system can consist of either a single or multiple components, and can include varying compositions.

Stream (6) and stream (7) represent an optional comonomer feed which can also be fed in the inlet(s), interstage(s), outlet(s) of the secondary compressor system. Optionally stream (4) and (6) can be lined-up to (19b) and/or (19a) as well. The discharge temperature of the secondary compressor system is typically between 60 and 100° C. The ethylene feed to the first reaction zone is typically preheated to a temperature from 130 to 180° C., while the ethylene, fed to a side feed to the reactor, is fed at the secondary compressor system discharge temperature, or cooled prior to feeding to the reactor. All other remaining parts of the reactor system are described above for FIG. 1.

Flow Scheme of CP10 to CP12, IP10.1, IP11.1 and IP12.1

Figure 6:
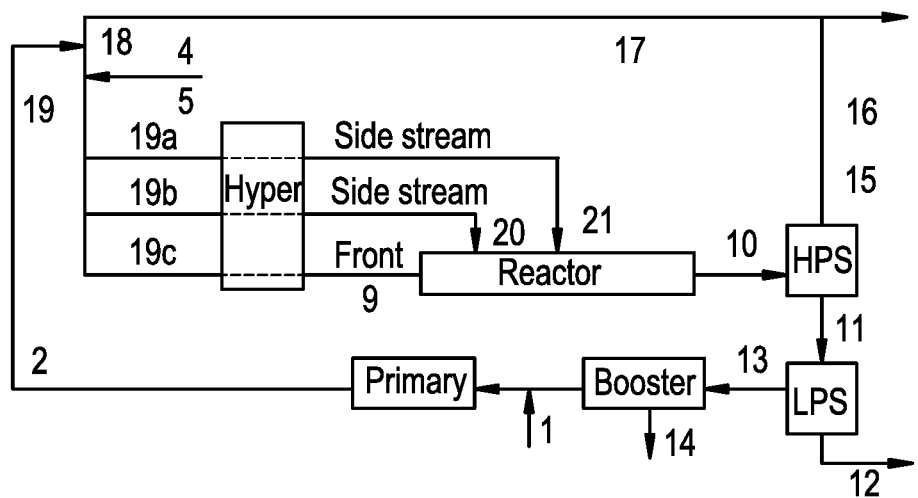
FIG. 6 is a process flow diagram containing a tubular reactor used for comparative polymerization CP10 to CP12, IP10.1, IP11.1 and IP12.1.

The Process Flow Diagram used for CP10, CP11, CP12, IP10.1, IP11.1 and IP12.1 is shown in FIG. 6. It is a generalized flow scheme of a simulated, high pressure polymerization reactor system containing a tubular reactor, where all three ethylene-based feed streams are divided and kept separated over secondary compressor system. Stream (1) is the fresh (make-up) ethylene, which is compressed together with the outlet of the Booster compressor by the Primary compressor to stream (2). The stream (2) is combined with stream (17) from high pressure recycle to form stream (18). Fresh CTA system (stream 4) and optional comonomer (stream 5) can be added into stream (18) to make stream (19). Stream (19) are then divided into stream (19a), stream (19b) and stream (19c) in which stream (19a) is sent after compression to the front of the reactor while stream (19b) and stream (19c) are sent to the side of the reactor through line (20) and line (21). All other remaining parts of the reactor system are described above for FIG. 2.

Polymerization Simulations

A polymerization simulation model with applied reaction scheme and kinetics is described by Goto et al. (Goto et al; Journal of Applied Polymer Science: Applied Polymer Symposium, 36, 21-40, 1981 (Title: Computer model for commercial high pressure polyethylene reactor based on elementary reaction rates obtained experimentally)). Other reactor and product modeling frameworks are available through ASPEN PLUS of Aspen Technology, Inc., Burlington, Mass., USA; and PREDICI of Dr. Wulkow, Computing in Technology GmbH (CiT), Rastede, Germany. Process and product responses predicted by these model frameworks are determined by the reactor parameters, the applied reaction scheme, and kinetic parameters. The applied reaction scheme and kinetic parameters are described below.

The polymerization simulations were achieved with Goto, LDPE simulation model, as discussed above. The kinetic data used by Goto et al. was derived from high pressure, free radical polyethylene polymerization experiments, performed at varying temperature, pressure and polymer concentration, as described in the following references: K. Yamamoto, M. Sugimoto; *Rate constant for long chain-chain branch formation in free-radical polymerization of ethylene; J. Macromol. Science-Chem.*, A13 (8), pp. 1067-1080 (1979). The elementary reaction steps are described by Goto et al. as follows: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation.

Kinetic data for main reactions are shown in Table 1, where $k_o$ is the pre-exponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (as analyzed by C13 NMR technique) in high pressure polyethylene, as a function of pressure and temperature conditions.

TABLE 1

Kinetic Constants for Main Reactions

| Reaction | ko | Ea | ΔV |
|---|---|---|---|
| | Units | | |
| | m³/hr/kmol | cal/mol | cc/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

In a high pressure (inlet pressure ≥100 MPa), free-radical polymerization, branching can be formed by the following predominant reactions: a) back-biting reactions, which are intramolecular reactions, leading to ethyl and butyl branches, b) reactions that incorporate alpha-olefins into the polymer molecule, and such alpha-olefins being used as chain transfer agents (for example; propylene, 1-butene, etc.); c) reactions involving transfer to polymer resulting in a polymer branch with a carbon length that depends on the number of ethylene insertions before this branch is terminated. For example, the intermolecular hydrogen transfer leads to the termination of a growing polymer molecule, and the reactivation of a "dead" or inactive polymer molecule. For reactions involving the transfer to polymer ("c" above), theoretically, this reaction could lead to branch length varying from ethyl and butyl branches up to 1000 carbons and more. The formation of ethyl and butyl branches by this reaction only occur at a very low and insignificant level, typically less than 0.1 per 1000 carbons. A long chain branch is formed from the intermolecular hydrogen transfer ("c" above), and leads to a broadening of the molecular weight distribution of the final polymer. For reactions under "b" above, the incorporation of an alpha-olefin does not result in the broadening of the molecular weight distribution of the final polymer. 13C NMR can be used to measure the level of long chain branching (LCB), defined as C6 or higher; however, corrections to the NMR spectrum can be made for the presence of any alpha-olefin (CTA) with a carbon number of eight or more, by comparing the spectra of polymer samples made with and without the presence of the higher alpha-olefin. The kinetics developed by Goto et al., and Yamamoto et al. focus on the relationship of process conditions, such as temperature, pressure and polymer concentration (expressed as incorporated ethylene units), on the kinetic parameters of the intermolecular hydrogen transfer ("transfer to polymer") and the impact of the level of intermolecular hydrogen transfer on the molecular weight distribution of the final polymer. The rate of long chain branching is a function of temperature, pressure and polymer concentration (expressed as number of ethylene incorporated). The long chain branching frequency is a function of the ratio of rate of long chain branching versus propagation of ethylene and/or comonomers. Table 1 shows that the long chain branching has a higher activation energy than the rate of propagation and therefore the long chain branching frequency will be promoted by higher polymerization temperatures.

The kinetic data for selected CTAs is given in Table 2. The kinetic constants haven been calculated with the help of the kinetic constants on the Cs-value (ks/kp) as determined by Mortimer (see References below), and the ethylene propagation kinetics as given by Goto et al. (see Table 1).

TABLE 2

Kinetic Constants for Selected CTAs

| Component | Chain Transfer to Modifier | | | Reactivity Ratios | |
|---|---|---|---|---|---|
| | kao | Ea | ΔV | $r_1$ ($k_{11}/k_{12}$) | $r_2$ ($k_{22}/k_{21}$) |
| | m3/hr/kgmol | cal/mol | cc/mol | | |
| Propylene (CTA) | 2.20E+11 | 13220 | −16.7 | 3.10 | 0.77 |
| Propion-aldehyde (CTA) | 1.07E+11 | 9720 | −8.4 | 0.00 | 0.00 |
| Isobutane (CTA) | 3.51E+11 | 14020 | −16.7 | 0.00 | 0.00 |

Propylene will beside of its CTA functionality also act as a comonomer, resulting in additional methyl branches. These additional methyl branches will typically lower the density of the polymer by 0.001 to 0.004 g/cc. Furthermore the comonomer activity will increase the overall consumption level per reactor pass, by which more propylene has to be added to compensate for the consumption as CTA as well as comonomer.

REFERENCES

General: G. Luft, *Chem.-Ing.-Tech., Hochdruck-Polyaethylen*, Vol. 51 (1979) Nr. 10, pages 960-969. Peroxide efficiency: T. van der Molen et al., *Ing. Chim. Ital*, "Light-off" temperature and consumption of 16 initiators in LDPE production, Vol. 18, N. 1-2, February 1982, pages 7-15. Chain transfer activity and comonomer reactivity scheme data are described in the following: P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at 1360 atm and 130° C.*; Vol. 8, p 1513-1523 (1970); G. Mortimer, Journal of Polymer Science: Part A-1, *Chain transfer in ethylene polymerization. Part V. The effect of temperature*; Vol. 8, p 1535-1542 (1970); G. Mortimer, Journal of Polymer Science: Part A-1, *Chain transfer in ethylene polymerization Part V. The effect of pressure*, Vol. 8, p. 1543-1548 (1970); and G. Mortimer, Journal of Polymer Science: Part A-1, *Chain transfer in ethylene polymerization VII. Very reactive and depleteable transfer agents*, Vol. 10, p 163-168 (1972). See LDPE simulation model in S. Goto et al., *Journal of Applied Polymer Science: Applied Polymer Symposium*, 36, 21-40, 1981 (Computer model for commercial high pressure polyethylene reactor based on elementary reaction rates obtained experimentally).

Initiator System

Table 3 shows that temperature and pressure have a significant influence, via the activation energy (Ea) and activation volume (ΔV), on propagation rates and radical termination rates. Peroxide efficiency is affected by the ratio $K_p$, $K_t^{1/2}$, and will therefore increase with higher temperature and/or higher pressure levels, and will decrease with lower temperature and/or lower pressure levels. For instance, Theo van der Molen et al. (see above References), show in their article "Light-off temperature and consumption of 16 initiators in LDPE production," that the consumption of initiators to reach a certain temperature level, in a high pressure LDPE reactor, is strongly affected by the operating pressure. Thus lowering operating pressure, without increasing the amount of initiator system, will lead to lower maximum zone or peak temperature(s) and lower monomer conversion level, for a given reactor system and vice versa.

index of polymers used in the simulations is 1 g/10 min and 10 g/10 min, and can easily be extended to a wider MI range. The polymerizations are simulated for a high pressure tubular reactor, operating at a reactor inlet pressure equal or below 320 MPa (3200 bar), using an ethylene-based throughput of 60 metric tons/hr (except for 35 Mt/hr for CP2 and CP3, data taken from JP05034422). The ethylene based flow coming from the hyper compressor is split by 100/0/0/0 (CP1 to CP3, CP1.1 and CP1.2), or 50/50/0/0 (CP4 to CP6, IP5.1, IP5.2 and IP5.3) or 25/25/50/0 (CP7 through CP9, IP8.1 and IP8.2) and 33/33/33/0 (CP10, CP11, CP12, IP10.1, IP10.2, IP11.1 and IP12.1), which indicates that the ethylene-based stream could completely be sent to the front, or partly distributed over both front and side of the reactor. A tubular reactor configuration comprises up to several thousand meters of total length, for four or more reaction zones. In this invention, the reactor length is varying from 1300 to 1500 meter, depending on the reactor configuration. The inside diameters of the reactor tubes are varied from 27 mm to 54 mm, for the first reaction zone, and from 38 mm to 54 mm, for the remaining part of the reactor. The reactor dimensions are selected to maintain a good process velocity of about 12 to 14 m/s. The pressure drop over the reactor is around 500 bar for all simulations. In all simulations, the side stream has been cooled down to 40° C. before feeding to the reactor.

Initiator systems comprising a mixture of multiple single initiators are injected into the reactor at different locations, to create multiple reaction zones, and thus creating a four peak temperature profile, and elevating the overall conversion. The half-life time of each peroxide is been listed in Table 3 Typically mixtures of Tert Butyl peroxy-2-ethylhexanoate (TBPO) and Di-tert-butyl peroxide (DTBP) have been used; however with low start and/or reinitition temperatures Tert Butyl peroxypivalate (TBPIV) was added or in case of lower peak temperature, 270° C. or lower, DTBP was replaced by Tert Butyl peracetate (TBPA).

The water temperatures, for cooling or heating the reaction zones, are operated with an inlet temperature of 155° C. in a counter current mode. Alternatively the water tempera-

TABLE 3

Half-life Temperature at Different Time of Each Organic Peroxide(*)

| Classification | Initiator system(**) | Chemical name | Half-life temp. [° C.] 0.1 [hr] |
|---|---|---|---|
| Class 1 | TRIGONOX 25 | Tert-Butyl peroxypivalate | 94 |
|  | TRIGONOX 21 | Tert-Butyl peroxy-2-ethylhexanoate | 113 |
| Class 2 | TRIGONOX F | Tert-Butyl peroxyacetate | 139 |
|  | TRIGONOX 201 | Di-tert-amyl peroxide | 150 |
| Class 3 | TRIGONOX 101 | 2,5-Dimethyl-2,5-di(tert-butylperoxyl)hexane | 156 |
|  | TRIGONOX T | Tert-Butyl cumyl peroxide | 159 |
|  | TRIGONOX B | Di-tert-butyl peroxide | 164 |
|  | TRIGONOX 145-E85 |  | 164 |

Note:
(*)Akzo Nobel brochure;
(**)TRIGONOX is a trade name of AKZONOBEL.

Detail of Tubular Reactor Simulations

Table 4 and Table 5 present the reactor configurations and process conditions for inventive and comparative polymerizations. The CTA types used for simulations, to control melt index, are Propionaldehyde (PA), Propylene and iso-butane. PA has the activity (Cs) of 0.33 with conversion of 10%, Propylene has Cs of 0.0122, and an assumed conversion of 20%, since it has both CTA and comonomer functionality, as measured by Mortimer at 1360 atm and 130° C. The melt tures can be operated at other uniform or non-uniform settings. The cooling zones can be operated in a co- and/or countercurrent mode. The simulations have been done with an inlet temperature of the first reaction zone of 150° C.

Figure 7:
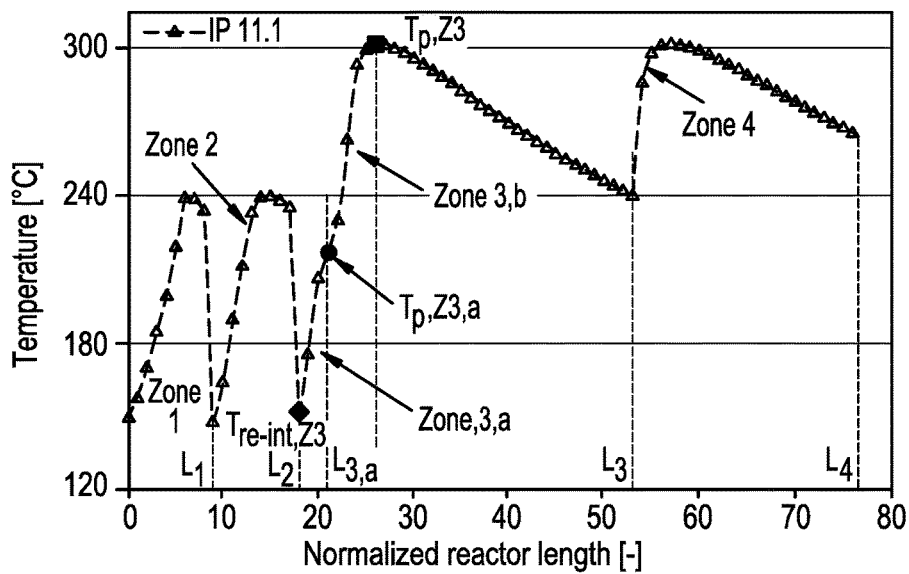
FIG. 7 depicts "temp. versus reactor length" for determination of the Tp,i values (used in the determination of $APT_{40\%}$ and $APT_{60\%}$).

Derivation of Averaged Polymerization Temperature (APT) of the First 40 wt % ($APT_{40\%}$) Polymer Formed and the Last 60 wt % ($APT_{60\%}$) of the Final Polymer Formed Assume that 40 wt % of polymer formation is reached within the reaction zone 3 at the reactor length $L_{3,a}$, indicated by "Tp,Z3,a" (see FIG. 7). The amount of polymer belonging to the first 40 wt % of the final polymer is calculated in (Eqn. 1).

$$M_{P40\%}=0.4\times M_{total\ polymer\ produced}\ [kg/hr] \quad \text{(Eqn. 1)}$$

This amount of polymer formation can be reached in either in the first or the second or the third reaction zone. In the calculation example below the first 40 wt % of the final polymer is formed in the third reaction zone.

The reaction zone 3 is considered as two separate reaction zones, called Z3,a and Z3,b. Note that Z3,a has re-initiation and peak temperatures of respectively $T_{re-int,Z3}$ and $T_{p,Z3,a}$. Subsequently, $T_{p,Z3,a}$ becomes the re-initiation temperature of the reaction zone Z3,b.

The output of the process simulation might not reveal exactly the temperature belonging the 40% wt polymer formation point, but the temperatures at the earlier and later locations are available. The temperature belonging to the 40% polymer formation point is calculated from the earlier and later data points following below calculation.

Calculation of $T_{p,Z3,a}$ (polymerization temperature at 40 wt % polymer formed)

$$T_{P,Z3,a} = \frac{40\% - \%_{P,Z3,a}^-}{\%_{P,Z3,a}^+ - \%_{P,Z3,a}^-} \times (T_{P,Z3,a}^+ - T_{P,Z3,a}^-) + T_{P,Z3,a}^-, \quad \text{(Eqn. 2)}$$

see FIG. 7 for a demonstration supporting Equation. 1, where $\%_{P,Z3,a}^-$ and $\%_{P,Z3,a}^+$ are the % wt of polymer form below (earlier) and above (later) 40% wt polymer formation (just on the left and right positions of "Tp,3,a" or L3,a in FIG. 7). The data points are directly taken from the process simulation results. $T_{P,Z3,a}^-$ and $T_{P,Z3,a}^+$ are the temperatures at the left and right of $T_{P,Z3,a}$, corresponding to $\%_{P,Z3,a}^-$ and $\%_{P,Z3,a}^+$ [° C.]. The cumulative production at reactor length (L) is indicated by "$M_{P,L}$". "L" is defined as the reactor length from the first inlet of the first reaction zone to the location at interest in the reactor. The production in reaction zone (Zi) is indicated by "$M_{P,Zi}$", where "i" indicates the number of the reaction zone. The cumulative production at the end of reaction zone i is indicated by "$M_{P,L,Zi}$". The amount of polymer produced in the reaction zone Z3,a and Z3,b is calculated by the following equations.

$$M_{P,Z3,a}=M_{P40\%}-M_{P,Z1}-M_{P,Z2}\ [kg/hr] \quad \text{(Eqn. 3)},$$

$$M_{P,Z3,b}=M_{P,Z3}-M_{P,Z3,a}\ [kg/hr] \quad \text{(Eqn. 4)}.$$

Similar to the next reaction zone (for example reaction zone (i+1)), the following equations apply.

$$M_{P,Z4}=M_{P,L4}-M_{P,Z3,b}\ [kg/hr] \quad \text{(Eqn. 5)},$$

where MP,Z1, MP,Z2, MP,Z3, MP,Z3,a, MP,Z3,b, MP,Z4 are the amount of polymer formed in the reaction zone 1, 2, 3, 3a, 3b and 4 [kg/hr], respectively. Average Polymerization temperature of each reaction zone (or reaction zone i) is an average temperature of re-initiation and peak temperature.

$$\overline{T}_{P,Zi} = \frac{T_{re-initiation,Zi}+T_{P,Zi}}{2}\ [° C.], \quad \text{(Eqn. 6)}$$

where i can be the first, second, third or fourth reaction zone. The $APT_{40\%}$ and $APT_{60\%}$ are calculated in (Eqn. 7) and (Eqn. 8) as follows.

$$APT_{40\%} = \frac{M_{P,Z1}\times \overline{T}_{P,Z1}+M_{P,Z2}\times \overline{T}_{P,Z2}+M_{P,Z3,a}\times \overline{T}_{P,Z3,a}}{M_{P40\%}}\ [kg/hr], \quad \text{(Eqn. 7)}$$

$$APT_{60\%} = \frac{M_{P,Z3,b}\times \overline{T}_{P,Z3,b}+M_{P,Z4}\times \overline{T}_{P,Z4}}{M_{P,Z3,b}+M_{P,Z4}}\ [kg/hr], \quad \text{(Eqn. 8)}$$

$$\Delta APT_{(60-40)\%}=APT_{60\%}-APT_{40\%}\ [kg/hr] \quad \text{(Eqn. 9)},$$

where $M_{P,Zi,a}$ is the amount of polymer produced in the reaction zone Zi,a.

$$M_{P40\%}=0.4\times M_{total\ polymer\ produced}\ [kg/hr] \quad \text{(Eqn. 10)}.$$

Example of $APT_{40\%}$, $APT_{60\%}$ and $\Delta APT_{(60-40)\%}$ calculation for IP8.1.

Process simulation result shows that 40 wt % of final polymer is formed in the reaction zone 3. At 38.8 wt % of final polymer formed at temperature of 206° C. At 41.8 wt % of final polymer formed at temperature of 217° C. Temperature at the first 40% of polymer formed is $$T_{P,Z3,a} = \frac{40\%-38.8\%}{41.8\%-38.8\%}\times (217° C.-206° C.)+206° C. = 211° C.,$$

$M_{P40\%}=0.4\times M_P(\text{totalpolymerproduced})=0.4\times 19128=7651$ [kg/hr]. The amount of polymer formed in reaction zone Z1 is 1494 [kg/hr]. The amount of polymer formed in reaction zones (1+2) or $M_{P,L,Z2}$ (amount of accumulative polymer formed at the end of the reaction zone 2 in FIG. 7) is 4399 [kg/hr]. The amount polymer formed in reaction zones (1+2+3) or cumulative polymer at the reactor position L3 ($M_{P,L,Z3}$) is 14388 [kg/hr]. The amount of polymer form at the end of the reaction zone 4 (or the end of the reactor in this case) is 19128 [kg/hr]

Thus, the calculated amount of polymer formed in each relevant reaction subzone is as follows: $M_{P,Z3,a}=M_{P40\%}-M_{P,L,Z2}=7651-4399=3253$ [kg/hr], $M_{P,Z3,b}=M_{P,L,Z3}-M_{P,Z3,a}-M_{P,L,Z2}=14388-3253-4399=6737$ [kg/hr], $M_{P,Z4}=M_{P,L,4}-M_{P,L,Z3}=19128-14388=4740$ [kg/hr]. Average polymerization temps of each reaction zone, $APT_{40\ wt\ \%}$, $APT_{60\ wt\ \%}$ and $\Delta APT_{(60-40)\%}$ are as follows:

$$\overline{T}_{P,Z1} = \frac{150° C.+240° C.}{2} = 195° C.$$

$$\overline{T}_{P,Z2} = \frac{140° C.+240° C.}{2} = 190° C.$$

$$\overline{T}_{P,Z3,a} = \frac{141° C.+211° C.}{2} = 176° C.$$

$$\overline{T}_{P,Z3,b} = \frac{211° C.+302° C.}{2} = 256° C.$$

$$\overline{T}_{P,Z4} = \frac{240° C.+302° C.}{2} = 271° C.$$

$$APT_{40wt\%} = \frac{M_{P,Z1}\times \overline{T}_{P,Z1}+M_{P,Z2}\times \overline{T}_{P,Z2}+M_{P,Z3,a}\times \overline{T}_{P,Z3,a}}{M_{P,Z1}+M_{P,Z2}+M_{P,Z3,a}} =$$

$$\frac{1494\times 195+2905\times 190+3253\times 176}{1494+2905+3253} = 185° C.$$

-continued $$APT_{60wt\%} = \frac{M_{P,Z3b_r} \times \overline{T}_{P,Z3b_r} + M_{P,Z4} \times \overline{T}_{P,Z4}}{M_{P,Zi,b} + M_{P,Z4}} =$$

$$\frac{6373 \times 256 + 4740 \times 271}{6373 + 4740} = 262° C.$$

$$\Delta APT_{(60-40)\%} = APT_{60\%} - APT_{40\%} = 262° C. - 185° C. = 77° C.$$

Normalized Molecular Weight Distribution (MWD)

Molecular Weight Distribution (representing the relationship between (dw/d log M) and log M) is an important parameter used in the polymerization designs, process development, improvement and operation. It is necessary to determine the types of polymer produced (narrow or broad MWD) which provide the desired product properties. Normalized MWD data can be obtained by using PREDICI commercial software package (licensed by Dr. M. Wulkow, *Computing in Technology, GmbH, Pater-Klbe-Straβe 7, D-26180 Rastede, Germany*), to construct MWD from polymerization kinetics (Goto kinetics in this study), through solving polymer population balance equations. The required inputs for PREDICI are the used Goto kinetics, and the monomer and/or co-monomer, initiator and CTA flows, temp. and pressure profiles, as well as elapsed time, all of which can be obtained from the process simulation. PREDICI software package can be used to generate normalized MWD data.

In this study, the MWD of each polymer has been calculated and subsequently normalized with the MWD of CP1 (100/0/0/0), following (Eqn. 11). The simulated MWD value for CP1 is 5.71.

$$MWD_{normalized} = \frac{MWD_{example}}{MWD_{CP1}} \times 100\%. \quad \text{(Eqn. 11)}$$

Comparative Polymerizations for Tubular Reactor: CP1, CP1.1, CP1.2, CP2 and CP3

The simulations of comparative polymers CP1, CP1.1, CP1.2, CP2 and CP3 have been done for the reactor configuration 100/0/0/0 (where the ethylene-based feed stream is fully sent to the first reaction zone). The inner tube diameter of the reactor is of 54 mm, giving an average process velocity of 13.6 m/s over the whole reactor length. In CP1, CP1.1, CP1.2 simulations, the reactor inlet pressure and the overall conversion level are maintained at respectively 2800 bar and at 31.9%. The conversion level is maintained at target level by adjusting the last peak temperatures, as shown in CP1.1 and CP1.2. Although almost all simulations were performed for products with a melt index of 1 g/10 min the simulations and trends can easily be extended to different melt-indices and CTA types. In the simulations for the 100/0/0/0 reactor configuration all CTA, make-up and recycled, is fed to the first reaction zone. More details can be found in Table 4 and Table 5.

In the CP1, ethylene is polymerized with high peak temperatures of 290, 290, 290 and 290° C. in the four reaction zones resulting in a LCB content of 3.13/1000 C in the final product. The temperature of the first 40% polymer produced ($APT_{40\%}$) and the last 60% polymer ($APT_{40\%}$) are 231° C. and 272° C., corresponding to a $\Delta APT_{(60-40)\%}$ of 42° C.

The normalized Molecular Weight Distribution (MWD) is 100%, namely $$MWD_{normalized} = \frac{MWD_{CP1}}{MWD_{CP1}} \times 100\% = 100\%.$$

The MWD of CP1 is used to calculate the normalized MWD values reported in Table 6. The $APT_{40\ wt\%}$ for CP1.1 is much lower than for CP1, namely 204° C. vs. 231° C. and there-fore $\Delta APT_{(60-40)\%}$ is increased from 42° C. to 77° C. The overall LCB level is increased, resulting in a slightly broader MWD (103% vs. 100%). The lowering of $APT_{40\ wt\%}$ does not result in a narrowing of MWD. Similar results have been observed for the CP1.2 where peak temperatures of 240° C./240° C./318° C./318° C. are applied, giving similar $APT_{40\ wt\%}$ as in the CP1.1 example.

Additional simulations using the reactor configuration and process conditions, described in JP05034422, have been carried out and are shown in CP2 and CP3 (see Table 4 and 5). These two simulations are used to make narrow MWD polymers at a low reactor inlet pressure of 2400 bar. It is shown that the lower first peak temperature (230° C. in CP2) operation gives higher $APT_{40\%}$, higher $APT_{60\%}$, higher final LCBf as well as higher conversion level than operating with equal temperature in the reaction zones (see case CP3). Note that the conversion levels of those simulation are 23.0 and 22.6% respectively.

Comparative Polymerizations for Tubular Reactor: CP4, CP5 and CP6

CP4 to CP6 represent the high pressure reactor configuration with an ethylene feed distribution of 50/50/0/0 over the reaction zones. The simulations were performed for a product with 1MI and using a CTA with Cs=0.33. In CP4, CP5 and CP6, the fresh ethylene coming from the primary compressor and the recycled ethylene coming from the HPR is equally distributed over both reactor feed streams resulting in even CTA (Z1/Zi=1) feed concentration along the reactor.

In CP4 the peak temperatures of 290, 290, 290 and 290° C. and a reactor inlet pressure of 3200 bar are applied, resulting in a normalized MWD of 104% and a conversion level of 31.9%. By lowering the reactor inlet pressure to the level of 2800 bar, the normalized MWD is increased to 119%, while maintaining the conversion level at 31.9% (see CP5). CP6 shows how much the peak temperatures have to be lowered, namely to 282, 282, 282 and 282° C., in order to reach a similar normalized MWD level as in CP4. Also other properties, in terms of LCBf and APT, are remained at the similar level as for CP4, except for the lower overall conversion (30.7% vs. 31.9%).

Comparative Polymerizations for Tubular Reactor: CP7 to CP12.

The process conditions and product properties of comparative CP7 to CP9 are very similar to the comparative examples of CP4 to CP6; except for the ethylene feed distribution of 25/25/50/0 vs. 50/50/0/0. In CP7 to CP9 the fresh ethylene coming from the primary compressor and the recycled ethylene coming from the HPR and the CTA (make up and recycle) are pro ratio distributed over reactor feed streams, resulting in equal CTA feed concentration along the reactor. Furthermore, the CP10 to CP12 examples show the process conditions and properties of simulated polymers using equal ethylene based feed stream distribution in a 33/33/33/0 reactor configuration. This equal flow distribution to the reaction zones is suitable for secondary compression systems, comprising 3, 6, 9, 12,15, etc., plungers in the second compression stage of the secondary compressor. The simulated polymer properties are shown in Table 6. Detailed information on the process conditions can be found in Table 4 and Table 5.

TABLE 4

Process configurations and operating conditions

| Ethylene feed distribution mol %[A] | Example | CI temperature [° C.] | Peak temperature [° C.] | Start/re-initiation temp [° C.] | Conversion [%] | Reactor inlet Pressure [bar] | Hyper throughput [Mt/hr] | Reactor inside diameter [mm] | Reactor length [m] |
|---|---|---|---|---|---|---|---|---|---|
| 100/0/0/0 | CP1 | NA | 290/290/290/290 | 150/251/256/262 | 31.9 | 2800 | 60 | 54/54/54/54 | 374/323/374/337 (total length 1408) |
| | CP1.1 | NA | 240/302/302/302 | 150/211/263/270 | 31.9 | 2800 | | | |
| | CP1.2 | NA | 240/240/318/318 | 150/211/215/284 | 31.9 | 2800 | | | |
| | CP2 | NA | 230/240/250/255 | 150/206/207/225 | 23.0 | 2400 | 35 | 46/46/46/46 | 210/210/210/180 (total length 810) |
| | CP3 | NA | 244/244/244/244 | 150/210/210/221 | 22.6 | 2400 | | | |
| 50/50/0/0 | CP4 | 40 | 290/290/290/290 | 150/169/262/264 | 31.9 | 3200 | 60 | 38/54/54/54 | 136/408/391/337 (total length 1272) |
| | CP5 | 40 | 290/290/290/290 | 150/169/262/264 | 31.9 | 2800 | | | |
| | IP5.1 | 40 | 240/295/295/295 | 150/140/259/261 | 31.9 | 2800 | | | |
| | IP5.2(*) | 40 | 240/294/294/294 | 150/140/257/260 | 31.9 | 2800 | | | |
| | IP5.3(**) | 40 | 240/294/294/294 | 150/140/257/260 | 31.9 | 2800 | | | |
| | CP6 | 40 | 282/282/282/282 | 150/165/246/251 | 30.7 | 2800 | | | |
| 25/25/50/0 | CP7 | 40 | 290/290/290/290 | 150/167/170/240 | 31.9 | 3200 | 60 | 27/38/54/54 | 136/153/663/337 (total length 1289) |
| | CP8 | 40 | 290/290/290/290 | 150/165/168/231 | 31.9 | 2800 | | | |
| | IP8.1 | 40 | 240/240/302/302 | 150/140/141/240 | 31.9 | 2800 | | | |
| | IP8.2(**) | 40 | 240/240/300/300 | 150/140/140/238 | 31.9 | 2800 | | | |
| | CP9 | 40 | 276/276/276/276 | 150/149/158/218 | 30.2 | 2800 | | | |
| 33/33/33/0 | CP10 | 40 | 290/290/290/290 | 150/168/210/226 | 31.9 | 2800 | 60 | 31/45/54/54 | 136/153/595/338 (total length 1272) |
| | IP10.1 | 40 | 240/240/301/301 | 150/142/173/236 | 31.9 | 2800 | | | |
| | IP10.2(**) | 40 | 240/240/298/298 | 150/141/172/233 | 31.9 | 2800 | | | |
| | CP11 | 40 | 290/290/290/290 | 150/168/210/225 | 31.7 | 2800 | | | |
| | IP11.1 | 40 | 240/240/303/303 | 150/142/174/238 | 31.7 | 2800 | | | |
| | CP12 | 40 | 290/290/290/290 | 150/166/207/214 | 34.0 | 2800 | | | |
| | IP12.1 | 40 | 240/240/302/302 | 150/141/302/302 | 34.0 | 2800 | | | |

(*)Fresh ethylene distribution to the side and equal fresh CTA distribution (Z1/Zi = 1),
(**) Fresh CTA distribution to the front (Z1/Zi>1), and fresh ethylene distribution to the side;
A) Mole % of ethylene plus CTA fed to each noted polymerization zone(s), and each mole percent based on the total moles of ethylene and CTA fed to the polymerization. The first percentage represents the mole % of ethylene plus CTA fed to the first reaction zone.

TABLE 5

Chain Transfer Agent and ethylene distribution to each reaction zone

| Ethylene feed distribution mol % | Ex. | MI (g/10 min) | CTA activity (Cs) | RZ1 | RZ2 | RZ3 | R2 | R3 | Z1/Z2 | Z1/Z3 |
|---|---|---|---|---|---|---|---|---|---|---|
| 100/0/0/0 | CP1 | 1 | 0.33 | NA | NA | NA | NA | NA | 1 | 1 |
| | CP1.1 | 1 | 0.33 | NA | NA | NA | NA | NA | 1 | 1 |
| | CP1.2 | 1 | 0.33 | NA | NA | NA | NA | NA | 1 | 1 |
| | CP2 | 1 | 0.33 | NA | NA | NA | NA | NA | 1 | 1 |
| | CP3 | 1 | 0.33 | NA | NA | NA | NA | NA | 1 | 1 |
| 50/50/0/0 | CP4 | 1 | 0.33 | 0.333 | 0.333 | NA | 1 | NA | 1 | 1 |
| | CP5 | 1 | 0.33 | 0.333 | 0.333 | NA | 1 | NA | 1 | 1 |
| | IP5.1 | 1 | 0.33 | 0.333 | 0.333 | NA | 1 | NA | 1 | 1 |
| | IP5.2 | 1 | 0.33 | 0 | 0.667 | NA | 0 | NA | 1.45 | 1.45 |
| | IP5.3 | 1 | 0.33 | 0 | 0.667 | NA | 0 | NA | 1.55 | 1.55 |
| | CP6 | 1 | 0.33 | 0.333 | 0.333 | NA | 1 | NA | 1 | 1 |
| 25/25/50/0 | CP7 | 1 | 0.33 | 0.333 | 0.333 | 0.333 | 1 | 1 | 1 | 1 |
| | CP8 | 1 | 0.33 | 0.333 | 0.333 | 0.333 | 1 | 1 | 1 | 1 |
| | IP8.1 | 1 | 0.33 | 0.333 | 0.333 | 0.333 | 1 | 1 | 1 | 1 |
| | IP8.2 | 1 | 0.33 | 0 | 0 | 0.666 | 0 | 0 | 1.14 | 1.61 |
| | CP9 | 1 | 0.33 | 0.333 | 0.333 | 0.333 | 1 | 1 | 1 | 1 |
| 33/33/33/0 | CP10 | 1 | 0.33 | 0.333 | 0.333 | 0.333 | 1 | 1 | 1 | 1 |
| | IP10.1 | 1 | 0.33 | 0.333 | 0.333 | 0.333 | 1 | 1 | 1 | 1 |
| | IP10.2 | 1 | 0.33 | 0.333 | 0.333 | 0.333 | 1 | 1 | 1.18 | 1.65 |
| | CP11 | 1 | 0.0122 | 0.333 | 0.333 | 0.333 | 1 | 1 | 1 | 1 |
| | IP11.1 | 1 | 0.0122 | 0.333 | 0.333 | 0.333 | 1 | 1 | 1 | 1 |
| | CP12 | 10 | 0.33 | 0.333 | 0.333 | 0.333 | 1 | 1 | 1 | 1 |
| | IP12.1 | 10 | 0.33 | 0.333 | 0.333 | 0.333 | 1 | 1 | 1 | 1 |

TABLE 6

Properties of simulated polymers.

| Ethylene feed distribution mol % | Ex. | SCB [1/1000 C] | Final LCBf [1/1000 C] | Normalized Mw/Mn [%] | $APT_{40\%}$ ° C. | $APT_{60\%}$ ° C. | $\Delta APT_{(60-40)\%}$ ° C. |
|---|---|---|---|---|---|---|---|
| 100/0/0/0 | CP1 | 22.91 | 3.13 | 100 | 231 | 272 | 42 |
|  | CP1.1 | 23.06 | 3.32 | 103 | 204 | 281 | 77 |
|  | CP1.2 | 23.08 | 3.48 | 104 | 204 | 276 | 72 |
|  | CP2 | 20.04 | 1.69 | 51 | 197 | 231 | 34 |
|  | CP3 | 19.94 | 1.60 | 49 | 190 | 230 | 40 |
| 50/50/0/0 | CP4 | 20.68 | 2.55 | 104 | 210 | 269 | 59 |
|  | CP5 | 22.47 | 3.10 | 119 | 209 | 266 | 57 |
|  | IP5.1 | 22.09 | 3.10 | 102 | 192 | 274 | 82 |
|  | IP5.2 | 22.00 | 3.07 | 83 | 192 | 273 | 81 |
|  | IP5.3 | 22.00 | 3.07 | 80 | 192 | 273 | 81 |
|  | CP6 | 21.71 | 2.76 | 103 | 208 | 261 | 54 |
| 25/25/50/0 | CP7 | 20.65 | 2.65 | 137 | 220 | 255 | 35 |
|  | CP8 | 22.40 | 3.21 | 164 | 218 | 249 | 31 |
|  | IP8.1 | 21.80 | 3.14 | 121 | 185 | 262 | 77 |
|  | IP8.2 | 21.65 | 3.09 | 87 | 184 | 260 | 76 |
|  | CP9 | 20.97 | 2.62 | 121 | 206 | 236 | 31 |
| 33/33/33/0 | CP10 | 22.67 | 3.20 | 152 | 225 | 255 | 31 |
|  | IP10.1 | 21.87 | 3.09 | 115 | 193 | 260 | 67 |
|  | IP10.2 | 21.68 | 3.03 | 82 | 192 | 258 | 66 |
|  | CP11 | 26.50 | 3.27 | 213 | 224 | 255 | 31 |
|  | IP11.1 | 26.10 | 3.22 | 175 | 193 | 261 | 68 |
|  | CP12 | 22.81 | 3.38 | 116 | 225 | 251 | 27 |
|  | IP12.1 | 22.11 | 3.29 | 89 | 193 | 261 | 68 |

Inventive Polymerization IP5.1, IP5.2, IP5.3, IP8.1, IP8.2, IP10.1, IP10.2, IP11.1 and IP12.1.

The inventive polymers have been simulated using different reactor configurations and operation conditions, as well as other important process parameters, such as fresh ethylene and/or fresh CTA distribution (see Table 4 and Table 5 for more detail). IP5.1, IP5.2 and IP5.3 have been carried out at the pressure level of 2800 bar, with lowering the first peak temperature to 240° C., while the remaining peak temperatures are increased to maintain the conversion level at 31.9%. In IP5.1, the normalized MWD is decreased from 119% to 102% (IP5.1 vs. CP5) by lowering the first peak temperature. In CP6, a similar decrease in normalized MWD, as achieved in IP5.1, is obtained by lowering the peak temperatures to 282, 282, 282 and 282° C., by which the conversion level is reduced to 30.7%. It is important to note that the IP5.1 example gives the same normalized MWD as CP6, but at a significantly higher conversion level (31.9% vs. 30.7%). Furthermore, the application of fresh ethylene distribution to the side of the reactor, and/or the distribution of fresh CTA to the first reaction zone, further decreases the normalized MWD to 83% (IP5.2) and to 80% (IP5.3), respectively, compared to 102% for IP5.1; however, the conversion is unexpectedly maintained at 31.9%. The properties of the simulated polymers are shown in Table 6. Surprisingly, IP5.1, IP5.2 and IP5.3, each show a lower normalized MWD as compared CP5, despite the similar final LCB levels in each final polymer. Furthermore, the $APT_{40\ wt\ \%}$ and $\Delta APT_{(60-40)\%}$ levels are, respectively, significantly lower and higher than the corresponding levels for CP5.

Figure 8:
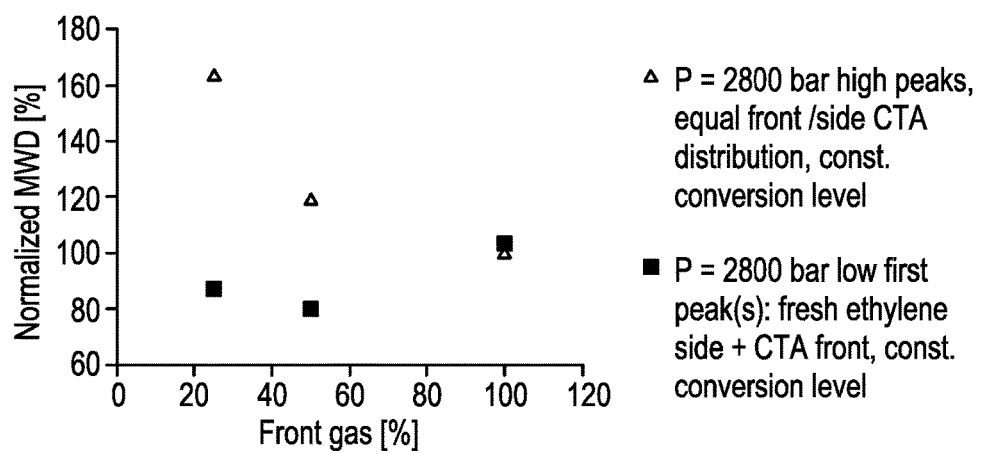
FIG. 8 depicts the normalized molecular weight distribution as a function of front gas, at constant conversion level, and at varying front peak temperature(s), and at varying fresh (make-up) CTA(s) and fresh (make-up) ethylene distributions.

Similar effects have been obtained for the IP8.1, IP8.2, IP10.1 and IP10.2 with two different ethylene feed streams to the side of the reactor. For instance, the IP8.1 and IP8.2 use the 25/25/50/0 ethylene based feed stream configuration, while the IP10.1 and IP10.2 use the 33/33/33/0 reactor configuration. The simulations are done using 240° C. as the first two peak temps, and maintaining the conversion of 31.9%, by increasing the two last peak temps. The impact of the 25/25/50/0 and 33/33/33/0 reactor configurations on the possible MWD range is much more pronounced (a broader range of possible MWD values) than the impact for the 50/50/0/0 configuration (IP5.1 to IP5.3) as shown in FIG. 8. The influence of CTA type with both CTA and comonomer activity has been studied in CP11 and IP11.1. For instance, propylene used as CTA, can also act as a comonomer, thus creating methyl groups in addition to the normal SCB level in the produced polymer, and this, in turn, lowers the final polymer density. Table 7 shows the influence of using propylene as CTA on the methyl and SCB levels.

TABLE 7

Influence on Methyl group and SCB level w/propylene as CTA in CP11 and IP11.1

| | SCB and/or Methyl [1/1000C] | | |
|---|---|---|---|
| Example | SCB/1000C | SCB + Methyl/1000C | Methyl/1000C |
| CP11 | 23.09 | 27.27 | 4.18 |
| IP11.1 | 22.46 | 26.92 | 4.46 |

Additional simulations CP12 and IP12.1 have been done to study the influence of higher MI (I2) on the polymer properties, such as LCBf, MWD and $APT_{40\ wt\ \%}$. As shown in Table 6, although both polymers have the same melt index (10 MI), and similar LCBf values, the inventive polymerization IP12.1 has a much lower normalized MWD of 89%, as compared to a normalized MWD of 116% for CP12. These results indicate that the inventive processes can be used to produce polymers of varying melt index values, and with low normalized MWD values. It can be concluded that that by a) sending less ethylene to the first reaction zone, b) increasing the flow and/or the number of feed streams at the side of the reactor, and/or c) varying the operating conditions; each in combination with the desired average polymerization temperature of the first 40 wt % polymer formed ($APT_{40\ wt\ \%}$), can be used to expand the MWD capability of a tubular reactor configuration.

The impact of the ethylene-based split ratio (percentage of ethylene sent to the front of the reactor) and process conditions (pressure, temp., selection of CTA system and distribution of fresh ethylene and/or fresh CTA) on the product properties (represented by normalized MWD, LCBf, $APT_{40\ wt\ \%}$, $\Delta APT_{(60-40)\%}$) have been investigated. The following has been discovered: (i) lowering $APT_{40\ wt\ \%}$ and increasing $\Delta APT_{(60-40)\%}$ improves the narrow MWD capability of the reactor configurations, in which the overall ethylene based feed stream is divided over the front reaction zone and side reaction zone(s); (ii) the inventive polymerization allows the production of narrow MWD products at constant conversion level, at reactor configurations using a distribution of the overall ethylene based feed stream over the front reaction zone and side reaction zone(s); (iii) at a constant conversion level, lowering the first and/or second peak temperatures, and maintaining the inlet pressure level, will narrow the normalized MWD; (iv) by applying different reactor conditions, for instance (a) inventive application of $APT_{40\ wt\ \%}$ and increasing $\Delta APT_{(60-40)}$ conditions for the production of narrow MWD products, (b) high pressure and low first and/or second peak temperatures, (c) differentiated fresh ethylene and fresh CTA distributions; the combination of (a) with (b) and/or (c) will extend the narrow MWD capability of the process.

It has been discovered that the production of LDPE with multiple (≥2) ethylene feed streams, and the application of different operating conditions, including low peak temperature(s) in the first, second or third reaction zones, enable the production of narrow MWD polymers, at constant and/or high conversion levels. Furthermore, it has been surprisingly discovered that narrow MWD polymers can be produced at high conversion level, and low operating pressure, by applying low peak temperature(s) in the first, second or third reaction zones, and distributing the fresh ethylene primarily to the side of the reactor, and/or distributing the fresh CTA primarily to the first and/or second reaction zones and selecting the Cs value of the CTA system. Surprisingly it has been found that the narrowest MWD polymers can be made with a reactor configuration, in which 30 to 40 mole % of the overall ethylene based feed is sent to the front reaction zone, while the remaining ethylene-based feed is divided over two or more reaction zones. The capability to produce narrow MWD polymers, at a lower reactor inlet pressure, allows the optimization of the secondary compressor system, in regard to energy consumption, or increasing throughput for the same energy consumption by enlarging the plunger sizes, and/or maintaining the external cylinder sizes. Favorable ethylene-based feed distribution can be achieved by combining one or more discharges of the plunger(s) of the secondary compression stage of the secondary compressor system, and sending the combined stream to the required reactor feed streams. Using throttle and or splitter valves is another way to achieve the required flow distributions.

The invention claimed is:

1. A process to form an ethylene-based polymer, said process comprising at least the following:
   polymerizing a mixture comprising ethylene, in the presence of at least one free-radical initiator, and in a reactor configuration comprising at least three reaction zones and at least two ethylene feed streams; and
   wherein the inlet pressure of the first reaction zone is less than, or equal to, 3200 Bar; and wherein the amount of ethylene, and optionally one or more comonomers, and optionally one or more CTAs, fed to the first reaction zone is from 40 mole % to 80 mole %, based on the total moles of ethylene, and optionally one or more comonomers, and optionally one or more CTAs, fed to the polymerization; and
   wherein the average polymerization temperature of the first 40 wt % polymer formed ($APT_{40\ wt\ \%}$) (based on the total amount of polymer formed) is less than, or equal to, 200° C.

2. A process to form an ethylene-based polymer, said process comprising at least the following:
   polymerizing a mixture comprising ethylene, in the presence of at least one free-radical initiator, and in a reactor configuration comprising at least four reaction zones and at least three ethylene feed streams; and
   wherein the inlet pressure of the first reaction zone is less than, or equal to, 3200 Bar; and wherein the amount of ethylene, and optionally one or more comonomers, and optionally one or more CTAs, fed to the first reaction zone is from 20 mole % to 70 mole %, based on the total moles of ethylene, and optionally one or more comonomers, and optionally one or more CTAs, fed to the polymerization; and
   wherein the average polymerization temperature of the first 40 wt % polymer formed ($APT_{40\ wt\ \%}$) (based on the total amount of polymer formed) is less than, or equal to, 200° C.

3. The process of claim 1, wherein the difference in the polymerization temperature (T2−T1) between the last 60 wt % of the final polymer formed (T2) and the first 40 wt % of the final polymer formed (T1) is greater than, or equal to, 58° C.

4. The process of claim 1, wherein the ethylene is fed to a first reaction zone (1) and to two or more subsequent reaction zones, zone n and zone n+1 or zone n+2, where n>1, and wherein the ethylene comprises fresh ethylene and recycle ethylene, and wherein at least two of the following ratios are met:
   a) for reaction zone n, the ratio, Rn, of "mole fraction of fresh ethylene fed to the first reaction zone (RZ1)" to "mole fraction of fresh ethylene fed to reaction zone n (RZn)" is (Rn=RZ1/RZn) is less than, or equal to, 1;
   b) for reaction zone n+1, the ratio, Rn+1, of "mole fraction of fresh ethylene fed to the first reaction zone (RZ1)" to "mole fraction of fresh ethylene fed to reaction zone n+1 (RZn+1)" is (Rn+1=RZ1/RZn+1) less than, or equal to, 1;
   c) for reaction zone n+2, the ratio, Rn+2, of "mole fraction of fresh ethylene fed to the first reaction zone (RZ1)" to "mole fraction of fresh ethylene fed to reaction zone n+2 (RZn+2)" is (Rn+2=RZ1/RZn+2) is less than, or equal to, 1; and
   wherein the "total amount of ethylene fed to the polymerization process" derives from at least one fresh ethylene stream and at least one recycled ethylene stream.

5. The process of claim 1, wherein the first ethylene feed comprises at least one CTA, and wherein the activity of the CTA system in the first ethylene feed is greater than, or equal to, the activity of the CTA system in each subsequent ethylene feed.

6. The process of claim 1, wherein the polymerization takes place in at least one tubular reactor, and wherein each ethylene feed to the reactor is generated from one or more discharge streams from a second compression stage of a secondary compressor system.

7. The process of claim 6, wherein the discharge streams, from the second compression stage of the secondary compressor system, are combined into at least two reactor zone feed streams.

8. The process of any one of claim 6, wherein each ethylene feed receives a discharge stream generated from one or more plungers from the second compression stage of the secondary compressor system, and wherein each ethylene feed contains the same molar amount of ethylene based feed components.

9. The process of claim 2, wherein the ethylene based feed stream fed to the first reaction zone is from 30 to 40 mole % of the total ethylene fed to the polymerization.

10. The process of claim 1, wherein the ethylene-based polymer is a LDPE.

* * * * *